US009710430B2

(12) United States Patent
Werner

(10) Patent No.: US 9,710,430 B2
(45) Date of Patent: Jul. 18, 2017

(54) REPRESENTATION OF DATASETS USING VIEW-SPECIFIC VISUAL BUNDLERS

(71) Applicant: Horst Werner, Mühlhausen (DE)

(72) Inventor: Horst Werner, Mühlhausen (DE)

(73) Assignee: SAP SE, Walldorf (DE)

( * ) Notice: Subject to any disclaimer, the term of this patent is extended or adjusted under 35 U.S.C. 154(b) by 217 days.

(21) Appl. No.: 14/274,254

(22) Filed: May 9, 2014

(65) Prior Publication Data
US 2015/0324453 A1 Nov. 12, 2015

(51) Int. Cl.
G06F 15/16 (2006.01)
G06F 17/21 (2006.01)
G06F 17/30 (2006.01)
G06F 17/24 (2006.01)

(52) U.S. Cl.
CPC ......... *G06F 17/211* (2013.01); *G06F 17/248* (2013.01); *G06F 17/30572* (2013.01); *G06F 17/30589* (2013.01); *G06F 17/30601* (2013.01); *G06F 17/30705* (2013.01)

(58) Field of Classification Search
CPC ............. G06F 17/30601; G06F 17/248; G06F 17/30705; G06F 17/211
USPC ........................................................ 707/738
See application file for complete search history.

(56) References Cited

U.S. PATENT DOCUMENTS 6,301,579 B1 * 10/2001 Becker .............. G06F 17/30592
8,301,632 B2 * 10/2012 Bovenschulte ........ G06Q 30/02
707/715
8,788,574 B2 * 7/2014 Beckman .......... G06F 17/30516
345/418
9,069,768 B1 * 6/2015 Sampson .......... G06F 17/30011
9,087,117 B2 * 7/2015 Cao .................... G06F 17/30601
2003/0167278 A1 * 9/2003 Baudel ............. G06F 17/30716
2007/0055782 A1 * 3/2007 Wright ................. G06T 11/206
709/227
2007/0150829 A1 6/2007 Eschbach et al.
2008/0222570 A1 * 9/2008 MacLaurin ....... G06F 17/30554
715/839

(Continued)

OTHER PUBLICATIONS

"Google Earth User Guide", retrieved from: http://static.googleusercontent.com/media/earth.google.com/en/us/userguide/v4/google_earth_user_guide.pdf, downloaded from the internet on May 9, 2014, 131 pages.

(Continued)

*Primary Examiner* — Usmaan Saeed
*Assistant Examiner* — Brian E. Weinrich
(74) *Attorney, Agent, or Firm* — Brake Hughes Bellermann LLP

(57) ABSTRACT

Techniques are described for providing visual bundlers that group and represent specified data subsets of very large datasets in a manner that is expressive and intuitive for a user, and which provide a dynamic, configurable visualization that may be leveraged by the user to search, aggregate, or otherwise interact with the data of a very large dataset. By nesting such visual bundlers, a geometric equivalent of a dynamically-generated search tree is realized, in which a structure for executing a search for a desired data element is not required to be fixed or otherwise predefined. Consequently, during a runtime of providing related visualizations, multiple alternative search trees may be created for the same underlying content, with minimal effort, and in a manner that is highly intuitive and useful for the user.

19 Claims, 23 Drawing Sheets

(56) References Cited

U.S. PATENT DOCUMENTS

| | | | |
|---|---|---|---|
| 2012/0311496 A1* | 12/2012 | Cao | G06F 17/30601 715/821 |
| 2012/0321193 A1 | 12/2012 | Ukil et al. | |
| 2013/0326398 A1 | 12/2013 | Zuverink et al. | |
| 2014/0280180 A1* | 9/2014 | Edecker | G06F 17/30598 707/740 |
| 2015/0100583 A1* | 4/2015 | Xi | G06F 17/30023 707/738 |
| 2015/0127565 A1* | 5/2015 | Chevalier | G06Q 10/00 705/319 |
| 2015/0286711 A1* | 10/2015 | Chin | G06F 17/30867 706/12 |
| 2015/0324391 A1 | 11/2015 | Werner | |

OTHER PUBLICATIONS

"Microsoft Live Labs Pivot", retrieved from: http://en.wikipedia.org/wiki/Microsoft_Live_Labs_Pivot, downloaded from the internet on May 9, 2014, 2 pages.

"Microsoft Silverlight PivotViewer", retrieved from: http://www.microsoft.com/silverlight/pivotviewer/, downloaded from the internet on May 9, 2014, 1 page.

Final Office Action for U.S. Appl. No. 14/274,250, mailed on Sep. 8, 2016, 15 pages.

Response to Non Final Office Action for U.S. Appl. No. 14/274,250, filed May 26, 2016, 10 pages.

Non Final Office Action for U.S. Appl. No. 14/274,250, mailed on Feb. 26, 2016, 13 pages.

\* cited by examiner

REPRESENTATION OF DATASETS USING VIEW-SPECIFIC VISUAL BUNDLERS

TECHNICAL FIELD

This description relates to data visualization.

BACKGROUND

Conventional computing systems provide for the storage of, and access to, large quantities of data. However, it may be difficult or inconvenient for users to locate desired data, or otherwise to interact with such large datasets in a desired manner.

In order to facilitate user interactions with large datasets, graphical user interfaces have been developed which are designed to provide visualizations of the data. For example, such graphical user interfaces may provide diagrams, charts, dashboards, or other visualizations representing data elements of a dataset, or aggregations or other combinations thereof. In some cases, users may be provided with an ability to zoom in or zoom out with respect to selected data elements, and/or to group selected subsets of data elements for collective viewing thereof.

While such systems and related techniques may be capable of providing a satisfactory user experience in certain contexts, significant room for improvement exists in the realm of visualizing, and otherwise interacting with, very large datasets. Moreover, in conventional data visualizations, the data visualizations may rely on predefined queries and data paths, and generally provide, at best, merely a simplified grouping of data elements corresponding to the predefined queries or data paths. Consequently, in these and other contexts, a user's ability to view and access data in a desired, flexible manner, and with a minimum of wait time or other inconvenience, may be effectively reduced or prevented.

SUMMARY

According to one general aspect, a system may include instructions recorded on a non-transitory computer-readable storage medium, and executable by at least one processor. The system may include a request handler configured to cause the at least one processor to receive a request for a visualization of plurality of data elements, the request including a common property, a property filter configured to cause the at least one processor to filter the plurality of data elements based on the common property, to obtain data subsets, and a template selector configured to cause the at least one processor to access grouping criterion linking the common property with at least one layout template providing a geometric representation of the common property. The system may further include a layout engine configured to cause the at least one processor to generate, based on the at least one layout template, a plurality of visual bundlers, each visual bundler corresponding to a data subset of the data subsets, and further configured to display the visual bundlers, each illustrating its corresponding data subset, to thereby provide the visualization in a manner that conveys the common property and a relationship of the data subsets to one another in the context of the common property.

According to another general aspect, a computer-implemented method for executing instructions stored on a non-transitory computer readable storage medium may include receiving a request for a visualization of plurality of data elements, the request including a common property, filtering the plurality of data elements based on the common property, to obtain data subsets, and accessing grouping criterion linking the common property with at least one layout template providing a geometric representation of the common property. The method may further include generating, based on the at least one layout template, a plurality of visual bundlers, each visual bundler corresponding to a data subset of the data subsets, and displaying the visual bundlers, each illustrating its corresponding data subset, to thereby provide the visualization in a manner that conveys the common property and a relationship of the data subsets to one another in the context of the common property.

According to another general aspect, a computer program product may be tangibly embodied on a non-transitory computer-readable storage medium and may include instructions that, when executed by at least one computing device, are configured to cause the at least one computing device to receive a request for a visualization of plurality of data elements, the request including a common property, filter the plurality of data elements based on the common property, to obtain data subsets, and access grouping criterion linking the common property with at least one layout template providing a geometric representation of the common property. The instructions, when executed, may be further configured to cause the at least one computing device to generate, based on the at least one layout template, a plurality of visual bundlers, each visual bundler corresponding to a data subset of the data subsets, and display the visual bundlers, each illustrating its corresponding data subset, to thereby provide the visualization in a manner that conveys the common property and a relationship of the data subsets to one another in the context of the common property.

The details of one or more implementations are set forth in the accompanying drawings and the description below. Other features will be apparent from the description and drawings, and from the claims.

BRIEF DESCRIPTION OF THE DRAWINGS

FIGS. 4A-4C are block diagrams of the same business data represented using three different types of visualizations, in which FIG. 4A illustrates the business data organized by business contact, FIG. 4B illustrates the business data organized by stages of business transactions, and FIG. 4C illustrates the business data organized chronologically along a timeline of business events.

FIGS. 12A-12C are example visualizations provided by the visualization engine of FIG. 10, in which FIG. 12A illustrates an example visual bundler using a geographic geometric shape, FIG. 12B illustrates a visual bundler containing technical assistance existing at a location within the geographic visual bundler of FIG. 12A, and FIG. 12C illustrates a specific technical system of FIG. 12B.

DETAILED DESCRIPTION

Figure 1:
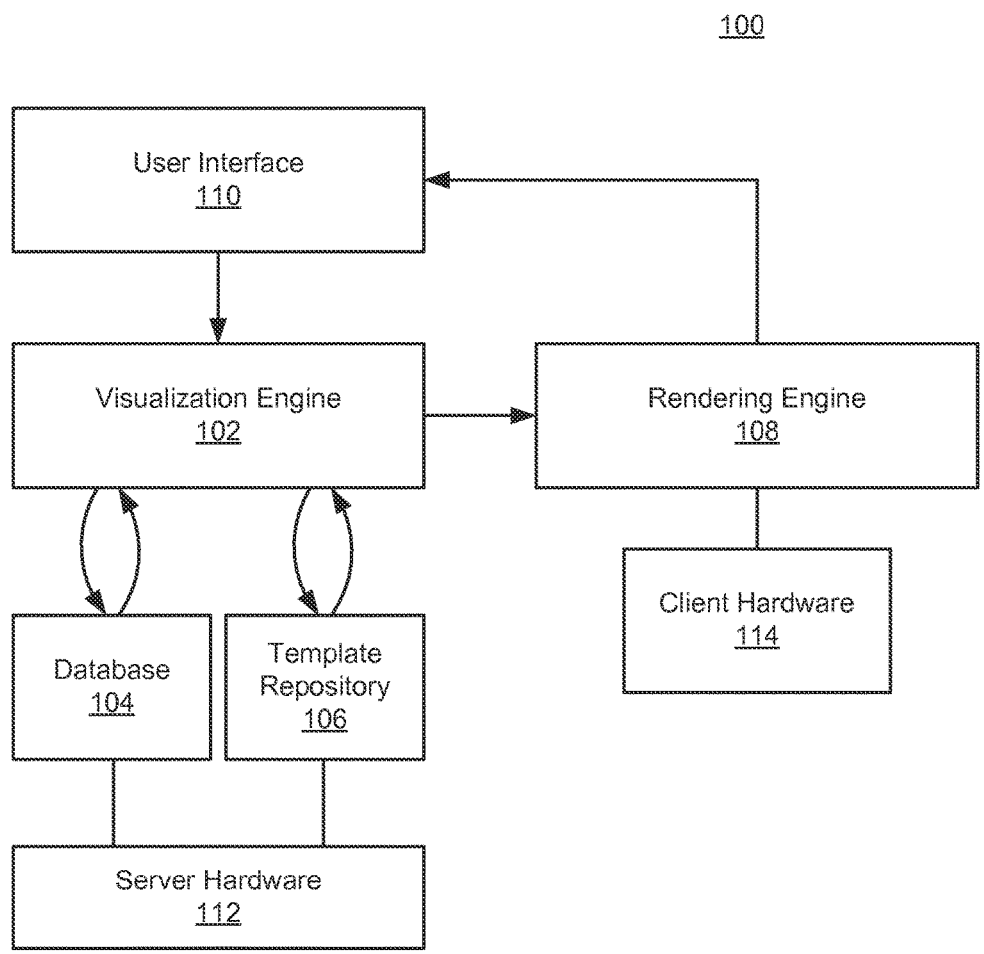
FIG. 1 is a block diagram of a system for data visualization using level of detail magnification.

FIG. 1 is a block diagram of a system 100 for data visualization using level of detail magnification. In the example of FIG. 1, the system 100 includes a visualization engine 102 that is configured to provide a fast, convenient, intuitive, and interactive visualization of very large datasets.

In particular, for example, the visualization engine 102 may be configured to provide a zooming or magnification effect which is experienced by the user of the system 100 in a smooth, seamless manner, even for extremely large datasets. Additional detail and explanation with regard to these example features of the visualization engine 102 are illustrated and described below with respect to the example embodiment of the visualization engine 102 of FIG. 2, and with respect to subsequent FIGS. 3-9 and associated description thereof.

In additional or alternative examples, the visualization engine 102 may be configured to provide visual bundlers which group and represent specified data subsets of very large datasets in a manner that is expressive and intuitive for user of the system 100, and which provides a dynamic, configurable visualization that may be leveraged by a user of the system 100 to search, aggregate, or otherwise interact with the data of a very large dataset. An example implementation of these and related features of embodiments of the visualization engine 102 are illustrated and described below with respect to the example visualization engine of FIG. 10, which is further described and illustrated with respect to FIGS. 11-20.

By way of context and overview, FIG. 1 illustrates that the visualization engine 102 may be configured to interact with a database 104, which may represent virtually any database capable of storing suitably large quantities of data. In particular example implementations, the database 104 may represent an in-memory database, such as the in-memory HANA database of SAP AG.

Further in FIG. 1, the visualization engine 102 is illustrated as communicating with a template repository 106. As described in detail below, the template repository 106 may be configured to store a plurality of layout templates, each layout template including various layout elements, so that the stored layout templates may be considered to represent visualizations that are at least partially preconfigured, to thereby facilitate constructions of data visualizations by the visualization engine 102.

For example, as also described in more detail below, the layout templates of the template repository 106 may each be described as having a particular geometric shape, relative size, color, static content (e.g., a header or other included text), or relationship to one or more other layout templates or types of layout templates. Meanwhile, layout elements of a specific layout template may be defined for inclusion within the corresponding layout template. In particular, a layout element may be embedded, perhaps with one or more other layout element or type of layout element within its corresponding layout template. Similarly, a layout template may be embedded within another layout template, thereby defining a hierarchy of embedded layout templates and associated layout elements.

Thus, the visualization engine 102 may be understood to be configured to combine data from the database 104 with layout templates and associated layout elements of the template repository 106, to thereby provide a defined visualization of the selected data from the database 104. Once such a visualization is defined, a rendering engine 108 may be configured to render the visualization within the context of a user interface 110. Various examples of the thus-rendered visualizations within the user interface 110 are illustrated and described below. In general, however, it may be appreciated that the rendering engine 108 may represent, by itself, virtually any conventional or otherwise suitable rendering technology or technique, e.g., a conventional browser, media player, or other technique for rendering visualization within the user interface 110.

FIG. 1 also illustrates that in the example of the system 100 of FIG. 1, server hardware 112 may be utilized to implement the database 104, the template repository 106 and the visualization engine 102. Meanwhile, client hardware 114 may be utilized to implement the rendering engine 108 and the user interface 110. In this regard, again, it may be appreciated that the client hardware 114 and the server hardware 112, as with the rendering engine 108, may represent otherwise-conventional hardware and software components, which are effectively transformed through the use of the visualization engine 102 and the template repository 106, and associated hardware and/or software, into the system 100 of FIG. 1. Consequently, further description of the server hardware 112, the client hardware 114, and/or the rendering engine 108 is not provided in detail herein, except as may be necessary or helpful in understanding operations of the system 100 of FIG. 1.

Moreover, it should be appreciated that the system 100 of FIG. 1 is intended merely as an illustrative and non-limiting example. In alternative implementations, the visualization engine 102 may be implemented partially or completely using the client hardware 114, while interacting with the database 104 and the template repository 106 by way of suitable network connection. Various other example implementation details of the system 100 of FIG. 1, some of which are described below, should be considered to be within the scope of the example of FIG. 1.

Figure 2:
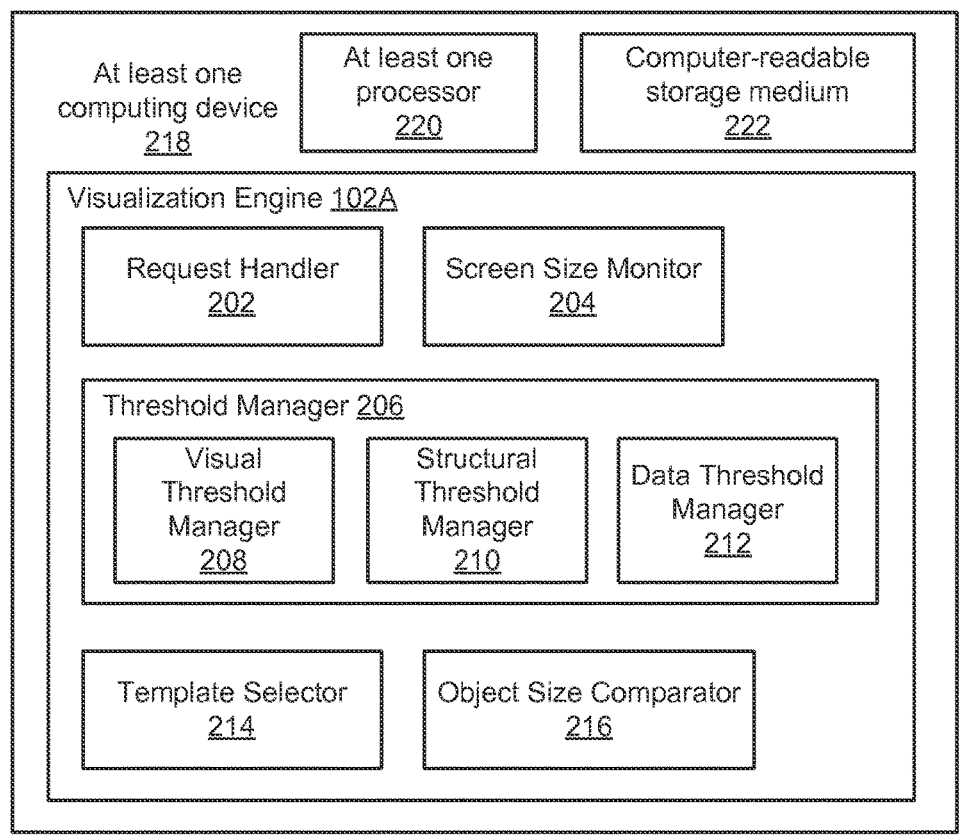
FIG. 2 is a block diagram of a first example embodiment of a visualization engine of FIG. 1.

FIG. 2 is a block diagram of an example implementation of a visualization engine 102A, representing an embodiment of the visualization engine 102 of FIG. 1. As referenced above, and as described in detail below, the visualization engine 102A may be configured to provide a level of detail magnification mechanism which allows the visualization engine 102A to present a birds-eye view visualization of thousands or millions of data elements, in which the visualization is capable of seamlessly exposing more detail as the user zooms in on a selected area of the visualization. Particularly when used with an in-memory database representing the database 104 of FIG. 1, the visualization engine 102A is capable of creating an illusion that all of the data of the database 104 is available for immediate rendering by the rendering engine 108. More particularly, a user of the visualization engine 102A is provided with an ability to continuously drill down and explore the visualized data, with a virtually-unlimited level of detail.

In particular example implementations, as described in more detail below, a visualization provided by the visualization engine 102A may represent every individual data object by a corresponding visual object that is available for showing at the user interface 110. Then, depending on a selected magnification level, such visual objects may be rendered as being very small (e.g., at a level of a single pixel), or very large, while transitions between these visual sizes is as seamless as optical zooming.

The visualization engine 102A achieves these and related results, for example, by anticipating when specific visual content of any generated visualization will be needed, so that data required from the database 104 for the generation of the visual content is retrieved in enough time for rendering thereof, at or before a time that the user of the visualization engine 102A needs or wants the requested visual content.

In other words, for example, during a time when the user is requesting an increased magnification of a specified portion of visual content, where the visual content is currently being displayed at a first visualization level, the visualization engine 102A may effectively anticipate that data at a more detailed level will soon be required for visualization thereof as a result of the current magnification request. Then, the visualization engine 102A may anticipatorily fetch some or all of the data from the database 104 that would be required for inclusion at the requested, magnified level of the visualization. Consequently, from a perspective of the user, it appears that the requested magnification and associated display of magnified data elements occurs in a smooth, fast, and seamless manner.

As referenced above, the layout templates of the template repository 106 may be instrumental in achieving these and related results. For example, embedded levels of layout templates and associated layout elements may generally correspond to magnification levels that may be requested by the user. Then, when the visualization engine 102A determines that the user is requesting magnification from a current magnification level to a subsequent magnification level, it may be necessary to retrieve data from the database 104 which is required for inclusion within the embedded layout template corresponding to the subsequent, requested magnification level.

Thus, such embedding of visual objects into visual objects, corresponding to the embedding of layout templates within layout templates, helps to provide for an effectively infinite level of detail, by providing an ability to recursively add visual objects for a related content, as the user zooms in with respect to a given visualization. In other words, the visualization engine 102A may be configured to leverage the defined layout templates of the template repository 106 to provide a dynamic creation of visual objects for rendering by the rendering engine 108 using the user interface 110.

The layout templates and related features facilitate such results by predescribing a visual design of each layout template (e.g., a geometry, typography, and arrangement of each layout template), as well as content to be visualized (e.g., attributes, or associated objects). The one or more layout elements of a particular layout template may thus describe, e.g., geometric shapes, text areas, or embedded visual objects. The layout elements may be bound to static content, such as captions or label text, or data content of the object to be visualized (e.g., attributes or associated data objects). In particular, with respect to the type of embedding of layout templates referenced above, layout elements may be used to describe embedded visual objects which specify a relation of each embedded object to a parent object within an overall data model of a template repository 106. For example, a representation of a group may embed group members by referring to a "has member" association.

In more detail, the visualization engine 102A is illustrated as including a request handler 202. The request handler 202 may be understood to receive any suitable request from the user, e.g., by way of the user interface 110 of FIG. 1. For example, as described in detail below, the request handler 202 may receive requests for specific groupings or views of specified data of the database 104. Once an initial visualization has been provided, as described herein, the request handler 202 may receive a request for magnification of the provided visualization (e.g., zooming in and/or zooming out of the provided visualization).

Further in the example of FIG. 2, the visualization engine 102A is illustrated as including a screen size monitor 204. In this regard, it may be appreciated that the user interface 110 may be provided with respect to a wide range of display screens. For example, the user interface 110 may be provided on a very large monitor or projection, or on a standard-size display screen (e.g., desktop monitor) associated with a desktop or laptop computer. In other examples, the user interface 110 may be provided in the context of a much smaller display screen, such as a display screen of a smartphone or other mobile device. Thus, it may be appreciated that the user interface 110 may in fact be provided on virtually any available or suitable display screen. Moreover, a user may request the same data to be displayed at different times on various display screens having corresponding various screen sizes.

As will be appreciated from the discussion below, the visualization engine 102A is capable of providing the type of seamless magnification described herein, regardless of a type or nature of available display screen. In so doing, the visualization engine 102A may rely on screen size obtained from the screen size monitor 204. For example, the screen size monitor 204 may provide a number and configuration of individual pixels of a current display screen, along with other suitable screen size information, such as dimensions of the display screen in question.

The visualization engine 102A also includes a threshold manager 206. The threshold manager 206 may be configured to utilize one or more predefined level of detail thresholds as a basis for triggering corresponding actions associated with a retrieval and ultimate rendering of requested data. In other words, as a magnification request is received from the user by way of the request handler 202, the threshold manager 206 determines, relative to screen size information obtained from the screen size monitor 204, whether the current magnification request is sufficient to initiate the actions necessary to provide the type of seamless zooming referenced above.

In the example of FIG. 2, the threshold manager 206 is illustrated as including a visual threshold manager 208, a structural threshold manager 210, and a data threshold manager 212. In reverse order, the data threshold manager 212 may be configured to determine when data required for creation of a corresponding layout element needs to be requested from the database 104 in order to finish associated fetching of the requested data in sufficient time to allow for a subsequent construction of the corresponding layout element, as well as for ultimate rendering of the combination of the retrieved data and associated layout element.

Thus, upon retrieval of the requested data from the database 104 in response to a determination of triggering of the data threshold, the structural threshold manager 210 may proceed to assemble or otherwise instantiate a corresponding layout template and associated layout elements from the template repository 106. In this regard, a template selector 214 may be configured to select one or more appropriate layout templates from the template repository 106, based on, e.g., which data has been requested by the user, and based on the specific magnification currently being requested by the user.

Once necessary data has been retrieved and corresponding layout templates have been instantiated or otherwise constructed, the visual threshold manager 208 may determine that the ongoing magnification request has reached a point that actual rendering of the already-obtained data and associated structure should begin to be executed by the rendering engine 108. In more detail, the visual threshold manager 208 may determine a particular manner in which a requested data object is actually transformed into pixels on a current display screen, depending on a current level of magnification requested by the user. For example, at a first level of magnification, a particular data element may be determined to be only the size of a single pixel, so that any included layout structure or associated data may not be distinguishable. At a second level of magnification, the same structure/data may be rendered at a higher level of detail, so that, for example, a shape or otherwise structural aspect may become visible. At a still further increased level of magnification, text of the retrieved data within the rendered layout element may become legible.

Thus, it may be appreciated that the various level of detail thresholds of the threshold manager 206 may be defined in terms of, e.g., pixels of a current display screen, as obtained from the screen size monitor 204. For example, a particular data object may reach a first pixel size corresponding to a data level of detail threshold defined by the data threshold manager 212, thus triggering retrieval of corresponding data. Upon further magnification, the data object may reach a second, larger pixel size, corresponding to a structural level of detail threshold defined by the structural threshold manager 210, thereby triggering instantiation of responding structure of a corresponding layout template selected by the template selector 214. Then, as magnification continues, the data object may reach a pixel size at which the rendering of the already-retrieved data and already-instantiated structure may begin. In this regard, as referenced and detailed in examples below, the pixel size of the various level of detail thresholds may be defined with respect to portions or fractions of an individual pixel, since, for example, it may be required to retrieve specified data at a time when a related data object is currently too small to be rendered with an even single pixel of a current display screen.

In order to implement the various thresholds of the threshold manager 206, an object size comparator 216 may be configured to perform the above-referenced comparisons of a pixel size of a data object in question, relative to a corresponding current level of detail threshold. That is, as just referenced, the object size comparator 216 may be configured to compare a current size of a data object that is in the process of being magnified, relative to, e.g., a data threshold of the data threshold manager 212. For example, at a point in time, a current magnification request may not yet have caused a data object to reach a pixel size that meets or exceeds a pixel size defined by the data threshold manager 212. However, as the magnification request continues, the pixel size of the requested data object will continue to grow, until the object size comparator 216 determines that the data threshold of the data threshold manager 212 has been triggered. At this point, the object size comparator 216 may cause the visualization engine 102A to execute an otherwise-conventional fetching of data required for the data object being magnified from the database 104.

Similar comments would apply to operations of the object size comparator 216 in comparing a current size of the data object being magnified with the structural level of detail threshold of the threshold manager 210, and, thereafter, with respect to the visual level of detail threshold of the visual threshold manager 208. It may be appreciated that the object size comparator 216 may be configured to make such comparisons based on screen size information obtained from the screen size monitor 204. In this regard, although the various level of detail thresholds referenced above have been described with respect to a pixel size of the corresponding display screen, other techniques may be used. For example, the object size comparator 216 may define comparisons with respect to level of detail thresholds that are defined in terms of a percentage of available screen size. In any case, it may be appreciated that operations of the visualization engine 102A may translate easily from various small screens, such as those available on smartphones or other mobile devices, all the way to large wall monitors or projections and beyond, since the threshold manager 206 and the object size comparator 216 are configured to operate based on whatever screen size is provided by the screen size monitor 204.

In the example of FIG. 2, the visualization engine 102A is illustrated as being executed using at least one computing device 218, which includes at least one processor 220 and computer readable storage medium 222. That is, as described, the at least one computing device 218 may represent virtually any suitable computing device, ranging from a mobile device to a desktop computer or workstation. As referenced above with respect to FIG. 1, the at least one computing device 218 may represent two or more computing devices, e.g., the server hardware 112 and/or the client hardware 114. Meanwhile, the at least one processor 220 may represent one or more processors operating alone or in parallel to provide the various features and functions of the visualization engine 102A as described herein. The computer readable storage medium 222 may represent virtually any suitable non-transitory computer readable storage medium that may be used to store instructions for the at least one processor 220, and/or required data. That is, for example, the computer readable storage medium 222 may represent two or more storage media, such as a main memory used to implement the database 104, a disc-based hard drive, one or more cache memories, or any desired or suitable arrangement of configured memory.

Figure 3:
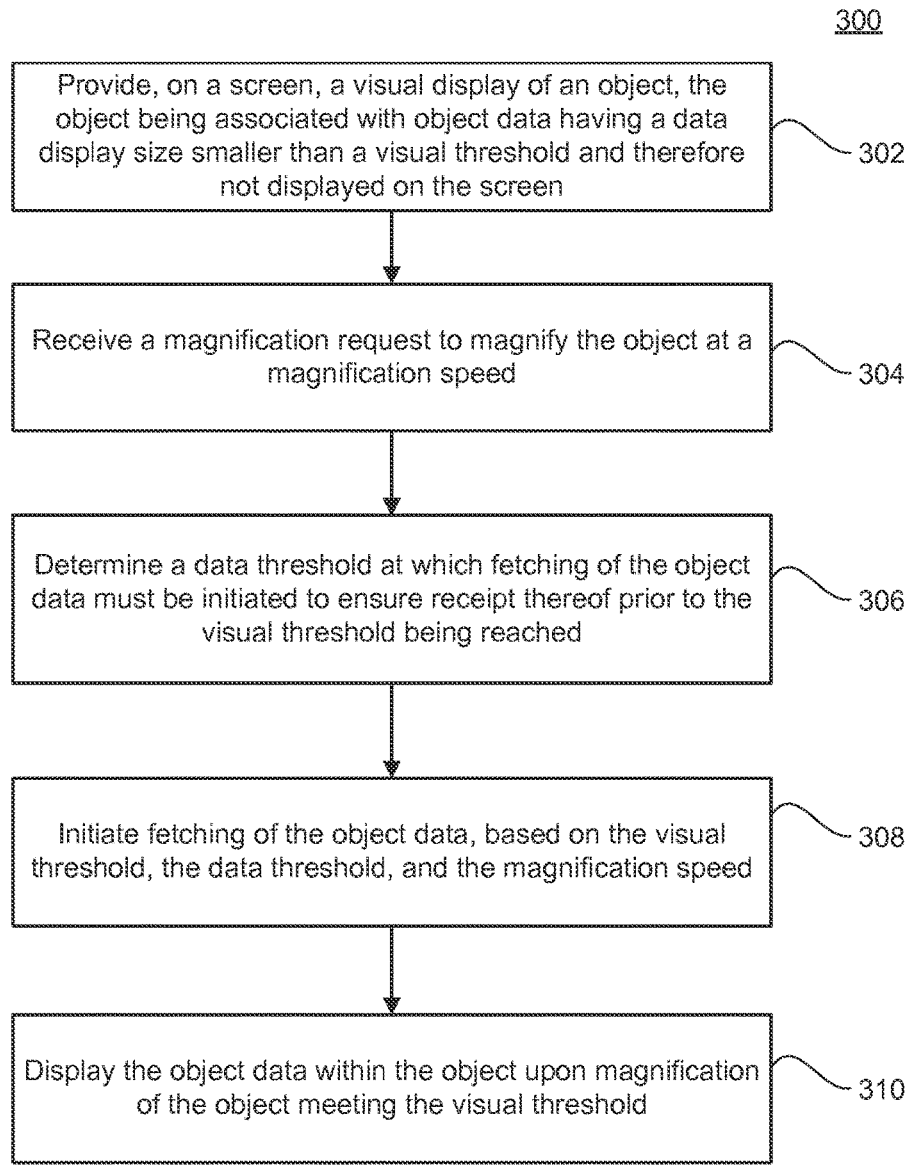
FIG. 3 is a flowchart illustrating example operations of the visualization engine of FIG. 2.

FIG. 3 is a flowchart 300 illustrating example operations of the visualization engine 102 A of FIG. 2. In the example of FIG. 3, operations 302-312 are illustrated as separate, sequential operations. However, it may be appreciated that, in additional or alternative implementations, operations of the flowchart 300 may be executed in a partially or completely overlapping or parallel manner, or in a nested, iterative, looped, or branched fashion. Moreover, in variations of such implementations, additional or alternative operations or sub-operations may be included, and/or one or more operations may be omitted.

In the example of FIG. 3, a visual display of an object may be provided on a screen, the object being associated with object data having a data display size smaller than a visual threshold and therefore not displayed on the screen (302). For example, the visualization engine 102A may be configured to provide a visualization of virtually any set of data elements or data objects stored within the database 104. Various specific examples of such data are illustrated and described below, but, in general, it should be appreciated that such examples are intended as illustrative and non-limiting examples. Thus, by way of such example, the database 104 should be understood to include, e.g., customers of a customer relationship management system, financial transactions executed by a business, data related to a manufacturing, shipping, or inventory of items for sale, or virtually any other business or non-business data that might be stored using the database 104.

Then, for example, when providing an initial visualization of such data, as referenced above, it may be impractical or impossible for the visualization engine 102A to include visualizations of data objects that are very small relative to higher levels of data objects and/or relative to an available screen size. For example, in the context of a customer relationship management database, the visualization engine 102A may provide a visualization, at a high level, of classes, groups, or other groupings of customers, in which an individual customer record would be too small to include when displaying a highest-available view of the customer database as a whole. Thus, with reference to the operation 302, such a customer record might correspond to the referenced object data having a data display size smaller than a visual threshold, and therefore not displayed on the corresponding, current screen.

A magnification request to magnify the object at a magnification speed may be received (304). For example, the request handler 202 may receive such a magnification request from the user of the system 100. Such magnification requests may be received in virtually any conventional manner. For example, the user interface 110 may be provided with corresponding graphical controls for requesting magnification of a designated area of a currently-rendered visualization. In related examples, available human input devices and associated hardware may be used. For example, a mouse with a scroll wheel may be utilized to zoom in or out of the provided visualization. Associated techniques for designating a portion of a visualization to be magnified, and for requesting the magnification, are generally known, and are therefore not described herein in further detail, except as may be necessary or helpful in understanding operations of the visualization engine 102A.

For purposes of understanding the operation 304, it may be appreciated that, in general, such magnification requests will be associated with a corresponding magnification speed. For example, the user may wish to zoom quickly from a customer-wide visualization of an entire customer database, all the way to an individual customer data record. In other examples, the user may execute an initial magnification within one area of a visualization of an entire customer database, determine that desired customer information is not likely to be included therein, and may zoom back out to a level of the entire customer database, to thereby select a different portion of the customer database for inspection. In the latter examples, magnification may occur at a more measured pace, as the user attempts to determine whether further magnification and inspection will be useful. In various examples, such magnification speeds may be implemented by available hardware or software. For example, a scroll wheel of a mouse may be scrolled at a desired speed, which would then correspond to a corresponding magnification speed. Similarly, selection and continuous operation of a graphical control for magnification provided by the user interface 110 may be considered by the request handler 202 to determine a current magnification speed.

A data threshold at which fetching of the object data must be initiated to ensure receipt thereof prior to the visual threshold being reached may be determined (306). For example, the threshold manager 206 (e.g., the data threshold manager 212), may determine a pixel size defining the data threshold in serving as a trigger for initiating of a fetching of the associated object data.

Fetching of the object data may be initiated, based on the visual threshold, the data threshold, and the magnification speed (308). Specific techniques for calculating the data threshold relative to the visual threshold to ensure that the relevant object data is fetched in time for rendering thereof are described below, e.g., with respect to FIG. 9. However, in FIG. 3, it may be appreciated the object size comparator 216 may initiate the fetching of the relevant object data from the database 104 when a pixel size of the object meets or exceeds the data threshold, relative to the visual threshold. In addition to the magnification speed as referenced in the operation 308, the object size comparator 218 may consider other useful factors, such as an average round trip time required to request and retrieve the desired data from the database 104. In any case, as described herein, it may be appreciated that the use of the visual threshold and the data threshold may enable initiation of fetching of the required object data in time to render the object data seamlessly in the context of magnification requests of the user.

Finally in the example of FIG. 3, the object data may be displayed within the object upon magnification of the object meeting the visual threshold (310). For example, the visualization engine 102A may cause the rendering engine 108 to display the relevant object data within the object, in the context of the user interface 110. For example, individual customer information may be displayed within a customer data object.

Of course, it may be appreciated that FIG. 3 represents a highly-simplified description of a basic example implementation of concepts underlying operations of the visualization engine 102A. In particular, for example, the simplified example of FIG. 3 does not explicitly require or describe use of the structural level of detail threshold described above with respect to corresponding layout templates. Of course, and as described in detail below, such structural thresholds may be included in various implementations.

For example, in such implementations, as described above with respect to FIG. 2, the structural threshold may be used to trigger instantiation of a corresponding layout template, once required data has been fetched and becomes available for use in instantiation operations for the corresponding layout template. In some implementations, however, such instantiation of corresponding layout templates may simply be executed in conjunction with triggering of the data threshold. In other words, for example, the data threshold may serve as both the data threshold and the structural threshold, so that data is fetched and a corresponding layout template is instantiated as soon as the data is available.

In the latter implementations, a marginal risk is incurred in that the corresponding structure may be instantiated needlessly, such as when the user decides to zoom out from a corresponding object prior to actual triggering of the corresponding visual threshold, so that the data is retrieved and the corresponding structure is instantiated, even though rendering of the data and structure does not occur at that point in time. On the other hand, in scenarios in which data is frequently required to be displayed during zoom operations, it may be more efficient to couple the instantiation of associated layout templates with the data arrival, so that, for example, it is not necessary to include the structural threshold manager 210 (and execute operations associated therewith) as a separate element.

Figure 4A:
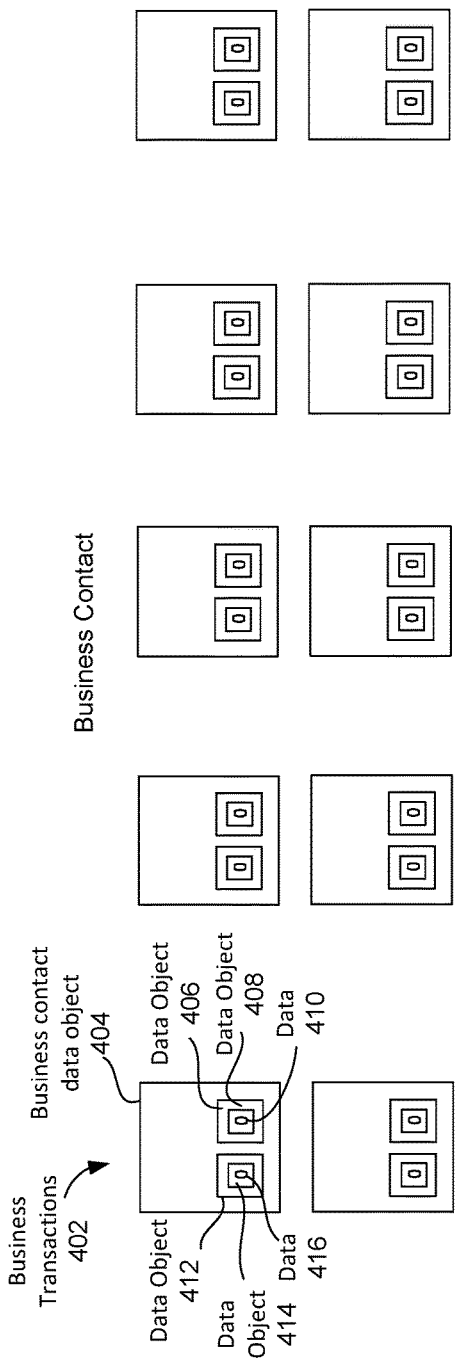

FIG. 4A is a block diagram of a visualization that might be provided by the visualization engine 102A, illustrating a collection 402 of business transactions organized by individual business contact data objects 404. In other words, for example, the collection 402 may contain individual business contacts, where any one such business contact may be associated a number of past, present/pending, or future business transactions. In more detail, for example, a business contact data object 404 is illustrated as including embedded elements 406, 412 at a lower level of a hierarchy of the visualization 402. Similarly, data objects 408 and 414 are embedded respectively within data objects 406, 412, and data 410, 416 is included respectively within data elements 408, 414. For example, the data object 406 may illustrate a pending order for a transaction yet to be consummated, so that the data object 408 and data 410 may represent, e.g., information describing a shipment or payment related to the pending order. Meanwhile, the data object 412 may represent a past order, so that the data object 414 represents a paid invoice and the data 416 represents text of the paid invoice.

Figure 4B:
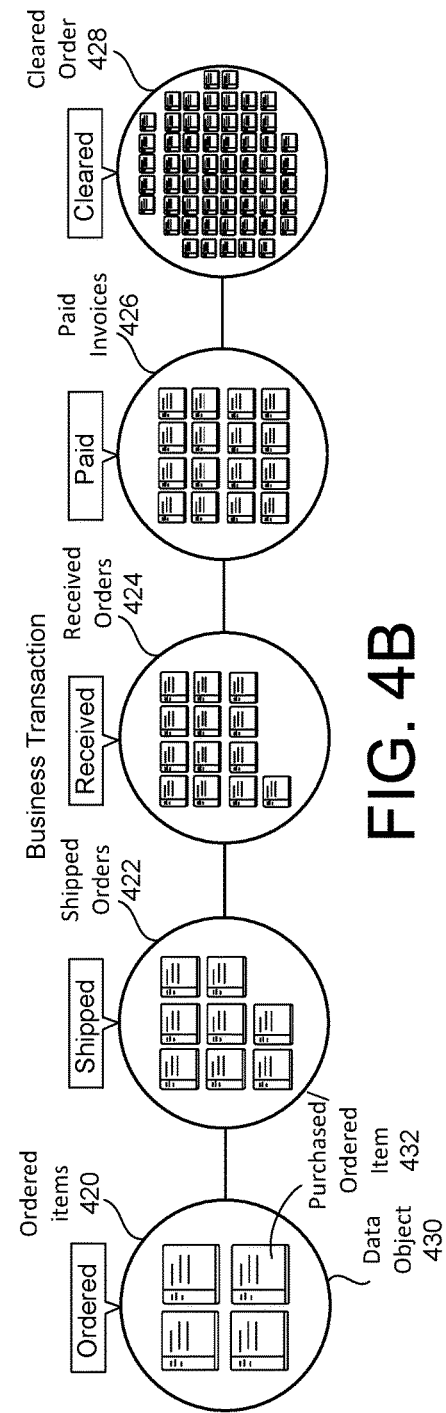

Meanwhile, FIG. 4B is a block diagram illustrating business transaction data objects 418 in a visualization of transaction stages 420, 422, 424, 426, and 428. Specifically, as shown, a data object 420 illustrates ordered items, while the data object 422 illustrates shipped orders. Meanwhile, the data object 424 illustrates received orders, while the data object 426 illustrates a stage in which invoices for orders have been paid, and the data object 428 represents a stage in which orders have been cleared. As shown in FIG. 4B, the ordered stage data object 420 may include a data object 430 embedded therein, which itself may include an embedded data object 432. For example, the data object 430 may represent an individual business contact, while the element 432 illustrates a particular item that has been purchased/ordered.

Figure 4C:
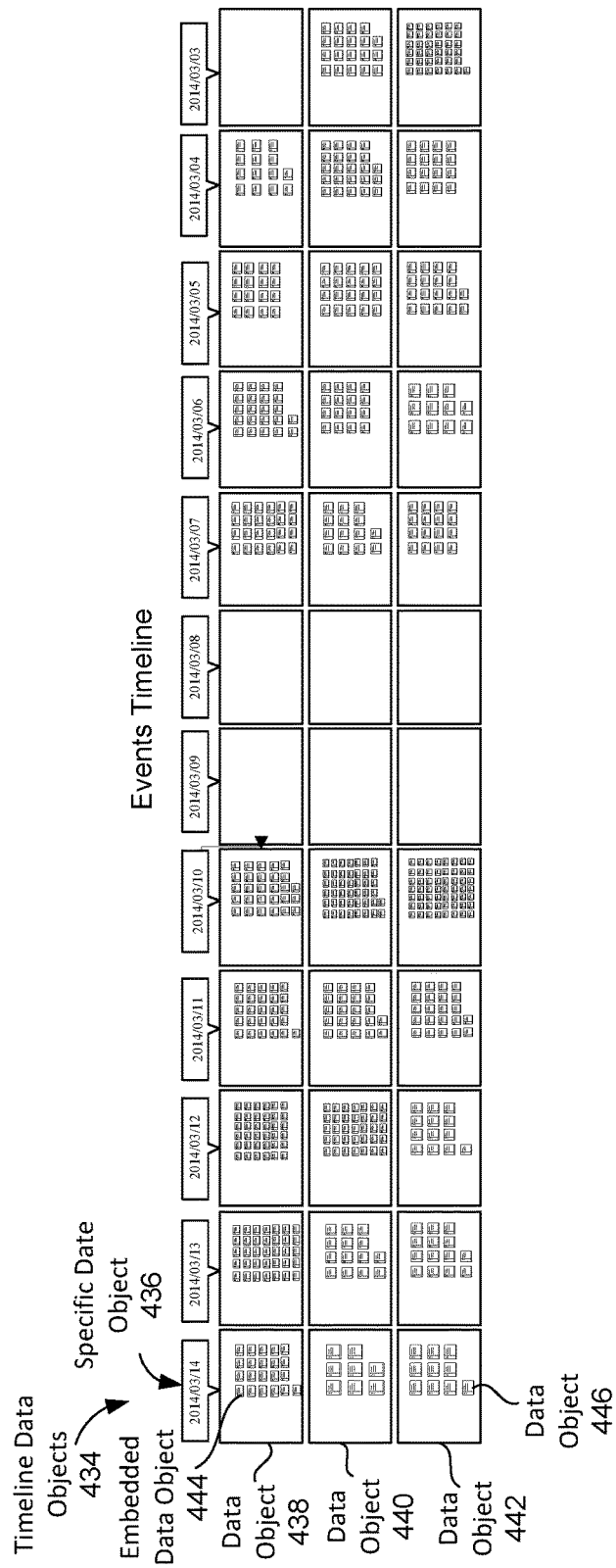

Further, in FIG. 4C, a visualization of events timeline data objects 434 is provided. As shown, a data object 436 illustrates a specific date at which various aspects of various business transactions occurred. Then, as also shown, a data object 438 may include various embedded data objects 444, with similar comments applying to a data object 440 and a data object 442 that includes data objects 446. It may be appreciated that the data objects 438, 440, 442 may be defined in a desired manner. For example, the data objects 438, 440, 442 may be representative of individual business contacts, any one of which may include, or be associated with, various past, present, or future transactions as discussed above with respect to FIG. 4A. On the other hand, the data objects 438, 440, 442 may correspond more closely to individual stages of FIG. 4B, irrespective of individual business contacts who might be included therein. In either case, as illustrated in FIG. 4C, the provided events timeline provides a convenient visualization of transaction information related to specific days.

More generally, the examples of FIGS. 4A, 4B, 4C illustrate, among other features, that the visualization engine 102 of FIG. 1 and the visualization engine 102A of FIG. 2 may be configured to provide visualizations in a highly flexible and interactive manner. That is, FIGS. 4A-4C all provide visualization of, and access to, the same data, but from very different perspectives. In this regard, as described in detail below with respect to FIGS. 10-20, it may be appreciated that the data objects of FIGS. 4A-4C may be considered to represent visual bundlers that are specifically configured to convey information regarding groups or types of data objects, as well as information regarding relationships between, or aggregations of, the various data objects.

Figure 5:
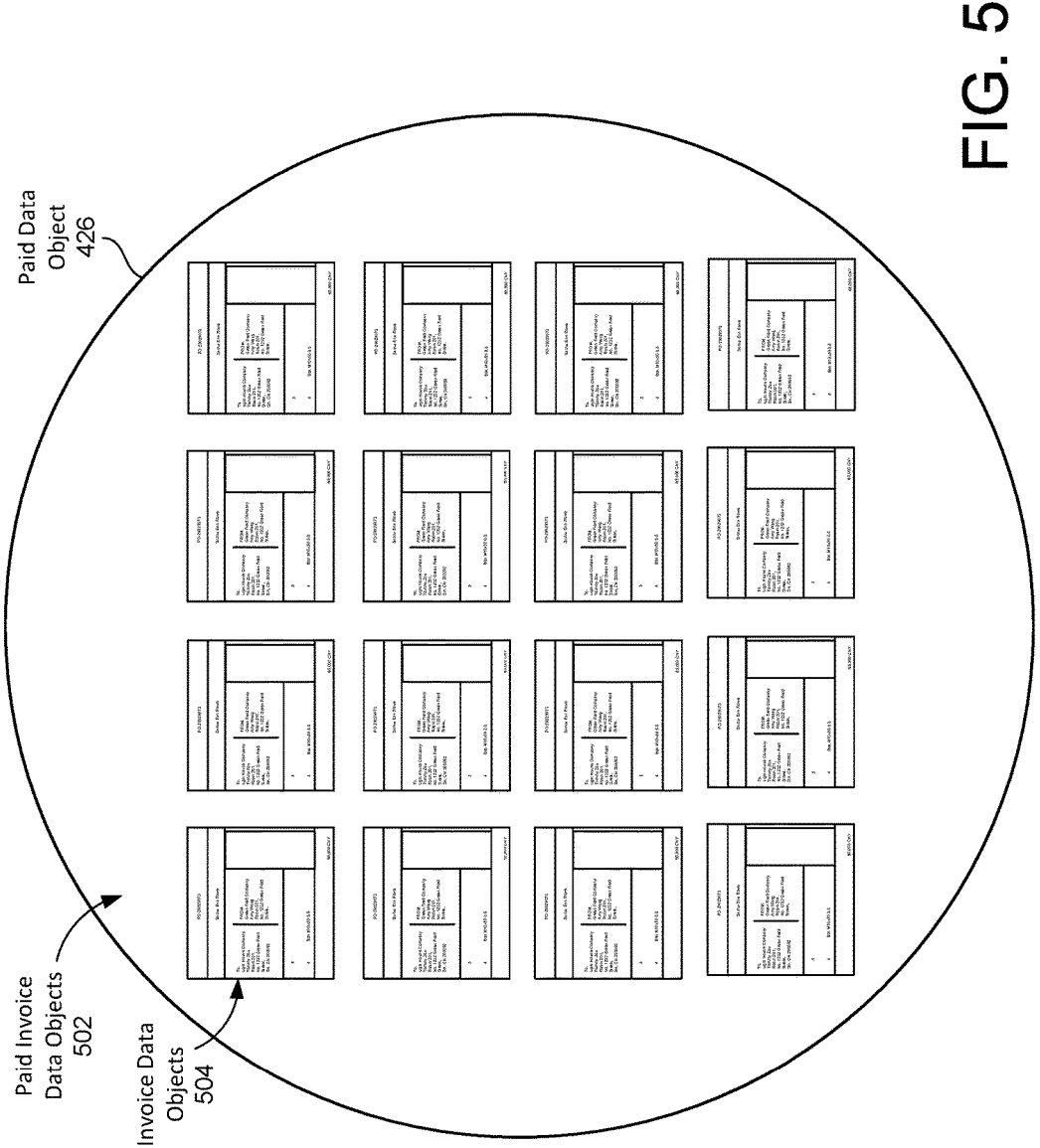
FIG. 5 is a magnified view of one of the business transaction stages of FIG. 4B.

In any case, regardless of a manner in which the data is visualized, the visualization engine 102A, in conjunction with the above description of FIGS. 1-3, may be understood to provide the user with an ability to utilize seamless zooming within the context of any such particular visualization. For example, FIG. 5 is a block diagram of a magnified view of the paid data object 426 of FIG. 4B. A shown, the paid data object 426 includes a plurality of paid invoice data objects 502, such as the individually-labeled invoice data objects 504.

Figure 6:
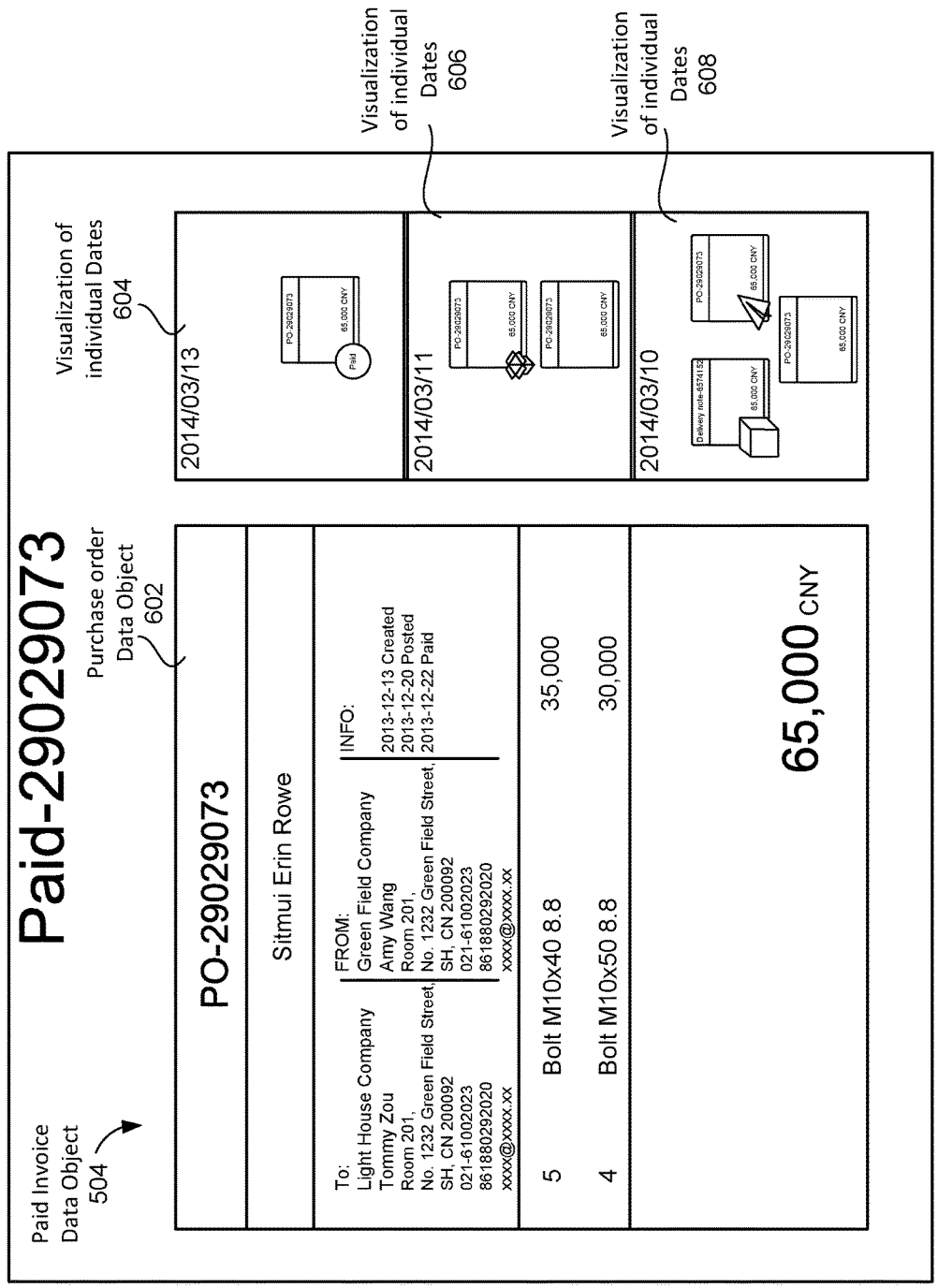
FIG. 6 is a magnified view of a transaction of the transaction stage of FIG. 5.

Meanwhile, FIG. 6 illustrates a further-magnified view of the paid invoice 504. As shown, FIG. 6 illustrates a purchase order data object 602, as well as several other transaction documents associated with a paid invoice of the data object 504. Specifically, as shown, data objects 604, 606, 608 provide a visualization of individual dates and associated transaction documents. As shown, the data object 604 associated with the date 2014/03/13 and the data object 606 is associated with the date 2014/03/11 illustrate transaction events that occurred on those dates, culminating with the payment occurring within the data object 604. Further, as shown in the further magnified view of FIG. 7, which illustrates the data object 608 related to the date 2014/03/10, further data objects for transaction documents associated with that date are illustrated. Specifically, as shown, the data object 702 illustrates a delivery note, data object 704 illustrates a purchase order, and the data object 706 illustrates a sales order.

Figure 7:
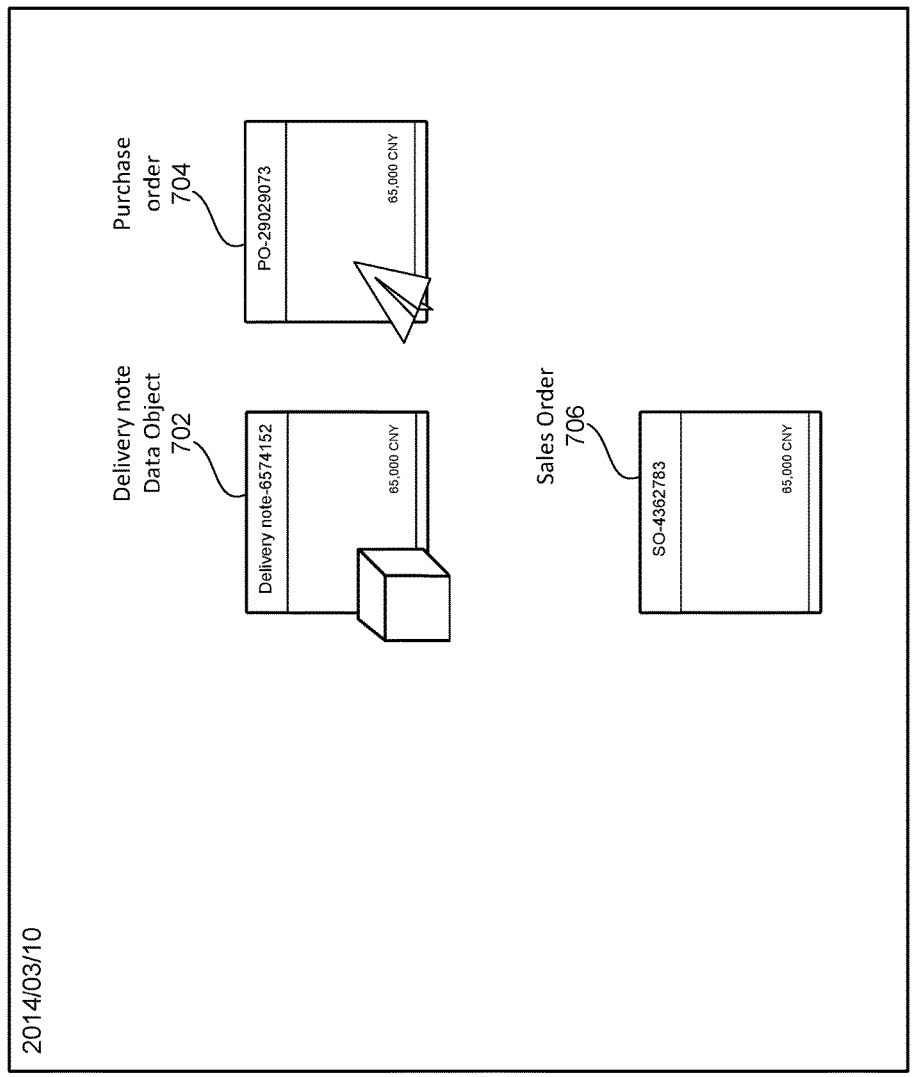
FIG. 7 is a magnified view of transaction documents of the transaction in FIG. 6, organized by dates.
Figure 8:
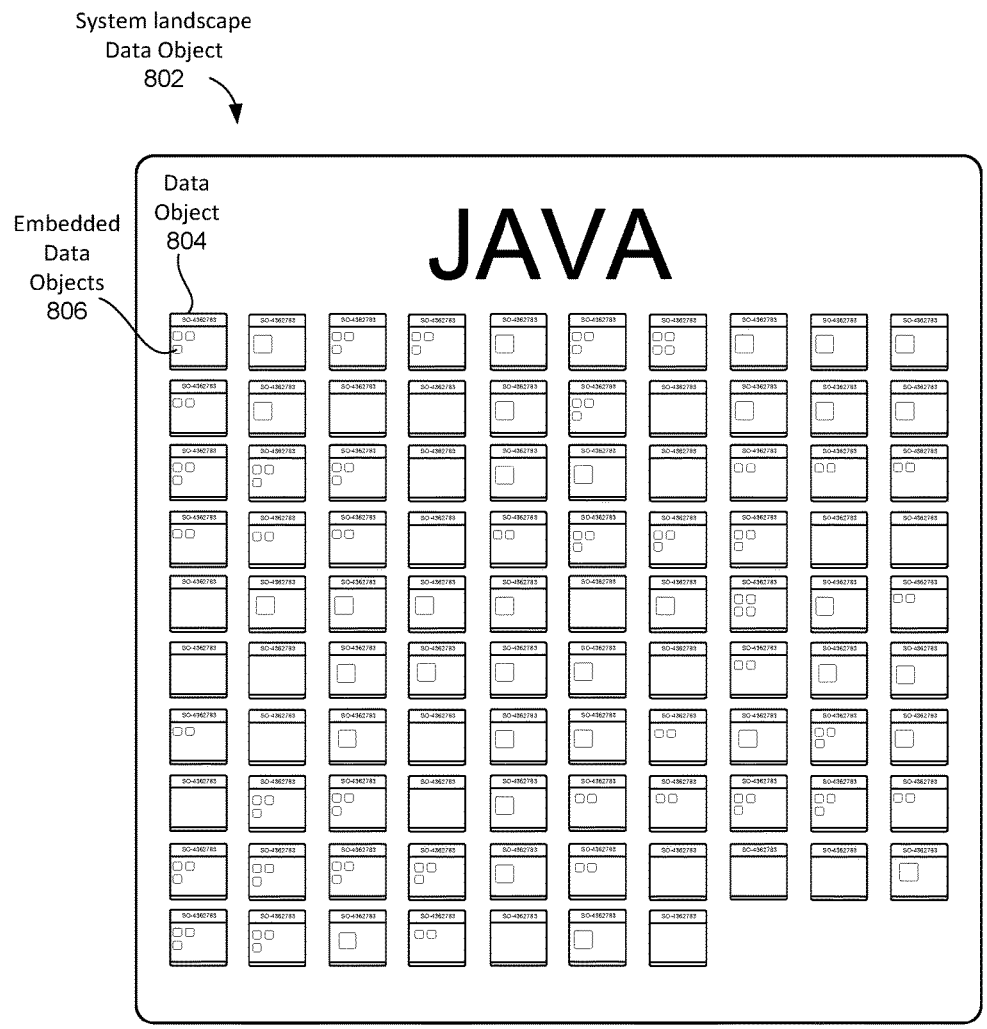
FIG. 8 is a block diagram of a visualization of a system landscape produced using the visualization engine of FIG. 2.

FIG. 8 is a block diagram of another example visualization that may be provided by the visualization engine 102A of FIG. 2. Specifically, as shown, FIG. 8 illustrates a system landscape of data objects 802, which might represent, for example, an entire system landscape of an organization. In the example of FIG. 8, a data object therefore may thus represent, e.g., a location, so that embedded data objects 806 might refer to individual workstations or other systems at that location. Conversely, in alternative examples, the data object 804 might represent a particular type of system, so that the embedded data object 806 might represent a location of the particular, corresponding system. In any case, it may be appreciated from the above discussion of FIGS. 4A-7 that the same information may be visualized in a variety of different manners, and, in those context, information may be organized and displayed in a manner which facilitates a desired interaction on the part of the user.

Figure 9:
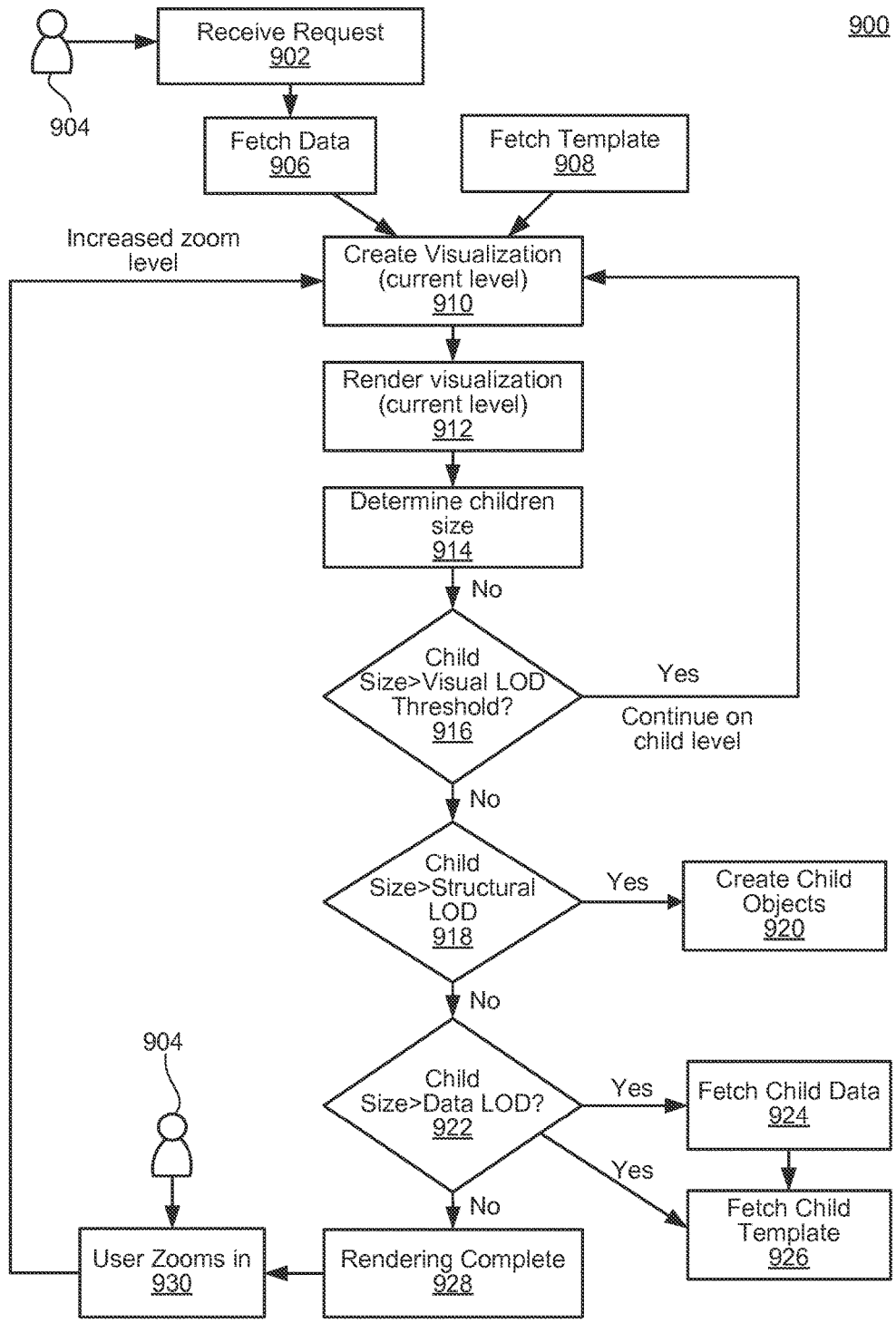
FIG. 9 is a flowchart illustrating more detailed example operations of the visualization engine of FIG. 2.

FIG. 9 is a flowchart 900 illustrating more detailed example operations of the visualization engine 102A of FIG. 2. In the example of FIG. 9, a request for a visualization of data may be received (902) from a user 904. For example, the user 904 may be requesting an initial visualization, to be used as a starting point for subsequent analysis and exploration of included data. By way of more specific example, the user 904 may request the type of visualization illustrated in FIG. 4B, in which business data related to, e.g., customers and associated business transactions, is represented in the context of transaction stages associated with initiating and ultimately consummating transactions with the customers in question.

In this regard, it may be appreciated that the request from the user 904 may be received by the request handler 202 by way of the user interface 110. However, in the example, the illustration of FIG. 4B, as referenced above, may be understood to represent an initial visualization, and therefore not yet associated with a specific request for magnification.

Thus, in response to the request for the visualization, identified, corresponding data may be fetched (906). In conjunction therewith, an appropriate layout template may also be fetched (908). For example, the template selector 214 of FIG. 2 may, based on the received request, access the template repository 106 in order to retrieve one or more layout templates corresponding to the requested data and associated, requested visualization.

Thereafter, the visualization engine 102A may create the requested visualization (910). That is, as described, the created visualization may be rendered at a first, current level of magnification. At the requested or default size of the created visualization, the visualization engine 102A must determine whether and to what extent included data and layout template structures should be fetched, instantiated, and/or rendered.

In more detail, the created visualization may be rendered at the current, e.g., default, level (912) by the rendering engine 108. For example, in the example of FIG. 4B, the business transaction data objects 418 may represent an initial or default level of magnification. In FIG. 4B, for example, at a level of the business transaction data objects 418, the paid business transaction data object 426 may be rendered in conjunction with remaining business transaction data objects 420, 422, 424, and 428. In the example, the paid business transaction data object 426 is associated with a layout template in the shape of a circle, having a certain color and being associated with static text indicating a title of "paid."

As may be appreciated from the above description, the business transaction data object 426, derived from a corresponding layout template as just referenced, may be associated with embedded layout templates and associated layout elements, which may thus be considered to be children elements 502 of the data object 426, as illustrated and described above with respect to FIG. 5.

Therefore, the visualization engine 102A may first determine an appropriate children size for an initial display of the children data objects 502 (914). That is, for example, in the example of FIG. 4B, the parent data object 426 is rendered at a certain, e.g., default, size, at which point it may occur that the thus-rendered data object 426 is associated with some number of children data objects 502. In an example extreme case in which only a single child data object is included, then the single child data object may be associated with a maximum possible size thereof that may be displayed within a context of the already-sized parent data object 426. In other examples, it may occur that a very large number of children data objects exist, in which case a size of each child data object may be determined to be very small. In an example implementation, the business transaction data objects 418 may initially, by default, be assigned a maximum size possible when considering an available screen size and a requirement to include all of the business transaction data objects 418 and the initial rendering. In other example implementations, however, a different default rendering size may be selected, or an initial rendering size of the business transaction data objects 418 may be flexibly or dynamically determined in conjunction with a number of children data objects to be included therein.

If a thus-determined child size of the children data objects is determined to meet or exceed a predefined visual level of detail threshold (916) as may be determined by the visual threshold manager 308, then rendering of the visualization may continue with a rendering of the corresponding children data objects (912). For example, in the example of FIG. 4B, 16 children data objects 502 are present, and may thus be rendered within a context of the parent data object 426 as described and illustrated above with respect to 4B, although a child size of the children data objects may meet or exceed the visual level of detail threshold, so that individual children data objects may be rendered, the child size may not sufficiently exceed the visual level of detail threshold to an extent necessary render legible text or other features therein. For example, the child size at the current level may result in individual child data objects being rendered as a single pixel within the parent data object 426. In examples where the child size is somewhat larger, the corresponding child data object may be rendered at a level that allows observation that text or other features are included, although not in a legible manner. Of course, at higher child sizes, corresponding children data objects may be rendered with included text and other features being completely legible.

Further, as may be observed from the operational loop between the determination of operation 916 and the rendering of operation 912, embedded levels of the visualization may be iteratively considered, until a level is reached at which a child size of that level does not exceed the visual level of detail threshold. In other words, for example, a parent data object may have a first child which easily exceeds the visual threshold, so that the child data object is rendered. The child data object may itself have a child (grandchild) data object that also exceeds the visual threshold, but to a lesser extent, and is thus rendered accordingly. Still further, the grandchild data object may itself have a child (great grandchild) data object, which, a current level of magnification, may fail to exceed the visual level of detail threshold, as determined in the operation 916.

Once such a child size is reached that is below the visual level of detail threshold (916), a determination may be made as to whether the child size of the child data object in question exceeds the structural level of detail threshold (918). In other words, for a child data object having a child size that is just below the visual threshold, it may still occur that the child data object has a size that exceeds the structural level of detail threshold, thereby indicating a need to create corresponding child data objects (920), in anticipation of the possibility of a subsequent magnification request causing the child size at the respective level to increase to a point of exceeding the visual threshold.

Similarly, if the child size of the child data object is below the structural threshold but above the data level of detail threshold (920), then corresponding child data may be fetched (920), along with a corresponding child template (926). Otherwise, if the child size is below the data threshold, there is no need to pre-fetch corresponding child data at this point, so that rendering of the visualization may be completed (928).

At this point in the operational flow of the flowchart 900, it may be appreciated that data objects above the visual threshold are included within the completed rendering, along with all associated instantiated layout templates and included data, and rendered at whatever level of legibility is possible for the determined rendering size. At one or more levels immediately below the visual threshold, instantiated layout templates and associated data objects may be populated with previously-fetched data (i.e., data fetched during a previous iteration of the flowchart 900). Meanwhile, at one or more levels below the structural threshold, data may be fetched, without having completed associated instantiations of corresponding data objects. Finally, below the level of the data threshold, it is not necessary to take any further action since it is assumed that during any subsequent zoom operations by the user 904, there will be sufficient time to fetch appropriate data and execute associated layout template instantiations, while data objects at higher levels are being rendered, and before a size of such children data objects reaches the visual threshold.

Specifically, as shown, as the user 904 zooms in to the visualization (930), the zoom or magnification level is increased at a certain magnification speed, so that the now-current magnification level is higher with respect to the rendering of the visualization (912). Consequently, a children size of children data objects of parent data objects at the current (updated) magnification level may be determined to be larger (914), so that associated children data objects may now have a child size which exceeds the visual level of detail threshold (916).

As may be appreciated, operations for populating and otherwise creating child objects at child sizes which exceed the structural threshold, if any, may proceed (918, 920). Creation of such child objects may continue until a child size no longer exceeds the structural threshold. Then, at lower levels, child sizes exceeding the data level of detail threshold may trigger the fetching of associated data and templates (922, 924, 926), which may continue until a currently-considered child size fails to exceed the data level of detail threshold, so that a rendering at the current level of magnification may be completed (928).

By way of specific example, and with reference to FIGS. 4B and 5-7, it may be appreciated that the business transaction data object 426 represents a first level, while child transaction data objects 502 represent a second level. Data objects 602-608 of FIG. 6 represent children of the data object 504 at a third level, while, as described above, the data objects of FIG. 7 represent fourth level. Therefore, with reference to FIG. 9, in a particular implementation, it may initially occur that only the highest level data object 426 has a size above the visual threshold, while the next-level data object 502 are above the structural threshold right below the visual threshold, and the grandchild data objects 602-608 are above the data threshold right below the structural threshold. Finally, in this example, the data objects at the great grandchild level of FIG. 7 may be below the data threshold.

After one level of magnification, both the data object 426 and child data objects 502 may exceed the visual threshold, while the grandchild data objects 602-608 now exceed the structural threshold, and the great grandchild data objects at the level of FIG. 7 now exceed the data threshold. If the data objects of FIG. 7 represent a lowest-available level, then it may be appreciated that further zooming by the user 904 may ultimately result in selected ones of the individual data objects being displayed and rendered as being above the visual threshold.

Although not explicitly mentioned above, it may be appreciated from the illustrations of FIG. 4B and FIGS. 5-7 that, at higher levels of magnification parent and grandparent data objects may become too big to be included within a display of a current display screen being used. For example, shown in FIG. 6, the data object 504 may be magnified to a point that remaining ones of the data objects 502, or the original, parent data object 426 are no longer visible. Of course, in response to zooming out by the user 904, corresponding operations of the flowchart 900, in pertinent part, may be reversed. Consequently, for example, higher level data objects previously-sized out of the rendering may be included again, and data previously-fetched for relatively low level data objects may be released to the database 104. Of course, a manner in timing of such release of previously-fetched data may depend on various factors, such as an extent of available memory, including local caches.

In a specific example implementation of FIG. 9, it may occur that the visual threshold for a particular detail to be rendered is 20 pixels, while a time for creating (rendering) the detail might be 10 ms. Meanwhile, an average round trip retrieval time for fetching associated data may be 200 ms, while zooming by a factor of 10 takes 500 ms.

Since zooming occurs exponentially, the formula for a magnification factor M over time t may be expressed as $M(t)=f^{(t)}$. Therefore, in the example just referenced, with a factor of 10 and 500 ms, the above formula yields $f=10^{(1/500)}=1.0046$, so that in the 10 ms for a detailed creation, the size increases to $1.0046^{10}=1.047$ of the original size, i.e., the object is about 5% bigger. Consequently, creation of the desired visual details should begin at a size of about 95% of the visual threshold, which, in the example, would be 19 pixels.

Further, during the 200 ms of the round trip, the size increases to $f^{200}=2.511$ of the original size. So in order to have the desired data available when the object is 19 pixels wide, the data should be requested when the object is about $19/2.511=7.5$ pixels wide, so that 7.5 pixels may be observed to be the data threshold.

Thus, in summary, the examples of FIGS. 2-9 illustrate that when a visual data object is newly created or rendered at a particular zoom level, a corresponding actual screen size may be calculated and compared with the various thresholds. If the visual object is larger than the data threshold and the data is not yet cached locally, the data should be requested. If the visual object is larger than the structural threshold and the detail objects are not yet created, then instantiation may proceed according to metadata of respected layout elements. Finally, if the visual object is larger than the visual threshold, then rendering of the visual object (using data and structure previously determined at previous zoom levels) may proceed.

Various other implementations may include additional or alternative features. For example, automatic zooming on a selected element may be supported by, e.g., evaluating, the various level of detail thresholds for a final or highest-available level of magnification, before zooming operations actually begin. In the final magnification level, adjacent visual objects of the selected data objects may be visible but small, and may be outside a visible area of a current display screen. In such scenarios, fetching of data and creation of structural element details may be suppressed, since the details would only be visible in a peripheral screen area, if at all.

Further, in additional or alternative implementations, it may occur that a particular magnification level includes a very large number of data objects. As zooming occurs, such data objects may increase in size, and may get closer and closer to reaching the visual threshold. The result may be a simultaneous creation of a large number of visual data objects, which might result in an undesired slowdown of the zooming process, or an undesired increase in processor load. In order to avoid such scenarios, the visualization engine 102A may preemptively begin a rendering process, and related processes, prior to the time that would otherwise be necessary according to the description of FIG. 9, above.

For example, rendering of a portion or percentage of the large number of data objects that might potentially be required to be created simultaneously may be executed preemptively. Of course, such operations run a risk that some or all of the rendering operations executed preemptively may not ultimately be necessary or required. For example, the visualization engine 102A may begin a rendering process for a percentage of data objects prior to visual threshold being reached, and the user 904 may elect to stop current zooming operations prior to ever reaching the corresponding visual threshold.

Nonetheless, in certain scenarios, it may be advantageous to execute the type of preemptive rendering just referenced. In a specific example, if a structural threshold is considered to be S pixels, then the structural threshold manager 210 and the object size comparator 216 may ensure that the corresponding objects are created when the corresponding objects would be S pixel large, where S may typically represent 1 pixel. Meanwhile, the data threshold may be represented as D pixels, so that the data threshold manager 212 and the object size comparator 216 may cause corresponding data to be requested when the object in question would be D pixels large, e.g., approximately 0.2 pixels. Then, in the example, a child object may be created when the corresponding data is available, and in accordance with a determination that a calculated random number between 0 and 1 is less than or equal to a value of a probability function P(CS), where CS represents a child size in pixels at a current zoom level.

In the example, this probability function is equal to 1 if CS is less than or equal to S, and the probability function may be chosen so that its value is less than or equal to 0 for CS<D. That is, if the size is so small that the data is not yet requested, then a probability that the child would be created will be 0. On the other hand, a value for CS=S would be equal to 1, because a probability of creation should be 100% when the size of the object reaches the structural threshold.

In a more particular example, a linear function may be written as P=(CS−D)/(S−D). In another example, a quadratic function, which will create fewer objects at lower sizes, would be $1-(S-CS)^2/(S-D)^2$. Of course, such probability functions are provided merely by way of example, and other types of functions may be used. For example, a discontinuous function may be used which has a constant value (e.g., P=0.2) for D<CS<D, 0 for CS<D, and 1 for CS greater than or equal to S.

Figure 10:
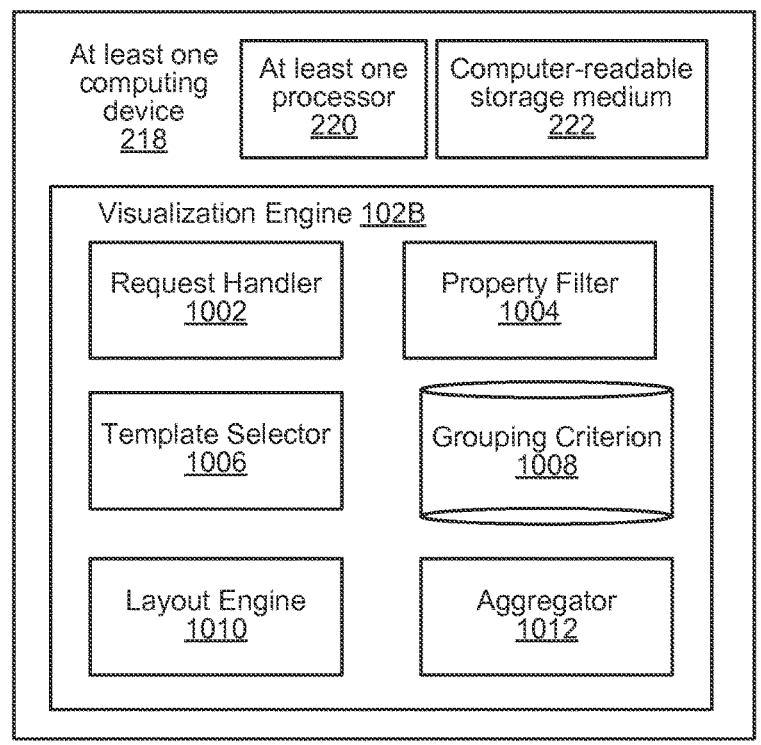
FIG. 10 is a block diagram of a second example implementation of the visualization engine of FIG. 1.

FIG. 10 is a block diagram illustrating a visualization engine 102B representing a second example embodiment of the visualization engine 102 of FIG. 1. As described in detail below, the visualization engine 102B may be configured to render very large sets of visual data objects in a way that visually conveys the meaning or other aspect of the data. Moreover, the resulting visualizations may be based on grouping criteria and layout templates, so that, as opposed to conventional, hard-coded visualizations, the visualizations of the visualization engine 102B may be created, transformed, or nested by the user.

In some example embodiments, the visualization engine 102B may be implemented in conjunction with features and functions of the visualization engine 102A of FIG. 2. In other words, the visualization engine 102 of FIG. 1 may be understood to represent some or all of either or both of the visualization engines 102A, 102B. In fact, many of the visualizations of the example visualizations of FIGS. 4A-8 may be implemented using features and functions of the visualization engine 102B. For the sake of clarity in the following description, the various example visualizations of FIGS. 12A-19 are primarily described with respect to features and functions of the visualization engine 102B. Nonetheless, as described where appropriate in the below description, and as just referenced, it should be appreciated that the visualization engines 102A, 102B may be used together synergistically to provide a desired experience for the user of the system 100 of FIG. 1.

In the example of FIG. 10, the visualization engine 102B includes a request handler 1002. As already described with respect to the request handler 202 of FIG. 2, the request handler 1002 may be configured to receive requests from a user, by way of the user interface 110. In the case of the visualization engine 102B, as described in detail below, the request handler 1002 may be configured to receive requests from the user for defining, characterizing, and displaying groups of data in a desired manner, and for subsequently regrouping or recursively regrouping the data in a manner which allows the user to interact with the data in an efficient, intuitive manner.

More particularly, a property filter 1004 may be configured to receive, by way of the request handler 1002, a desired or specified property that is common to groups of data stored within the database 104. In conjunction with operations of the property filter 1004, a template selector 1006 may be configured to utilize grouping criterion 1008 to select one or more appropriate layout templates from the template repository 106 of FIG. 1. In this way, a set of visual objects may be divided into subsets according to specified properties that all elements in each subset have in common. Then, each of these subsets may be put into a visual bundler, which is generated based on a specified layout template that is selected by the template selector 1006, based on the grouping criterion 1008.

Additionally, a layout engine 1010 may be configured to calculate or otherwise determine a position, size, or other characteristic of the resulting visual bundlers, depending on data associated therewith. As a result, the visual bundlers provided by the visualization engine 102B may be arranged meaningfully with respect to one another, and may be provided with a relative size or other visual characteristic that conveys information to the user with respect to the data included within each visual bundler, or with respect to relationships between the data and/or the bundlers.

Finally in the example of FIG. 10, the visualization engine 102B is illustrated as including an aggregator 1012. As described in detail below, the aggregator 1012 may be configured to aggregate values included within each visual bundler. Such aggregation may include, for example, summations, averages, minimum/maximum values, or virtually any appropriate or available calculation or other interpretation of values or other data included within the visual bundler.

Thus, the user may change any of the current grouping criterion, bundler layout, or bundler arrangement during runtime of a visualization. Afterwards, the visual data objects may immediately change, dissolve and re-form, or otherwise rearrange themselves to match the user's changes, in a smooth animation.

Figure 11:
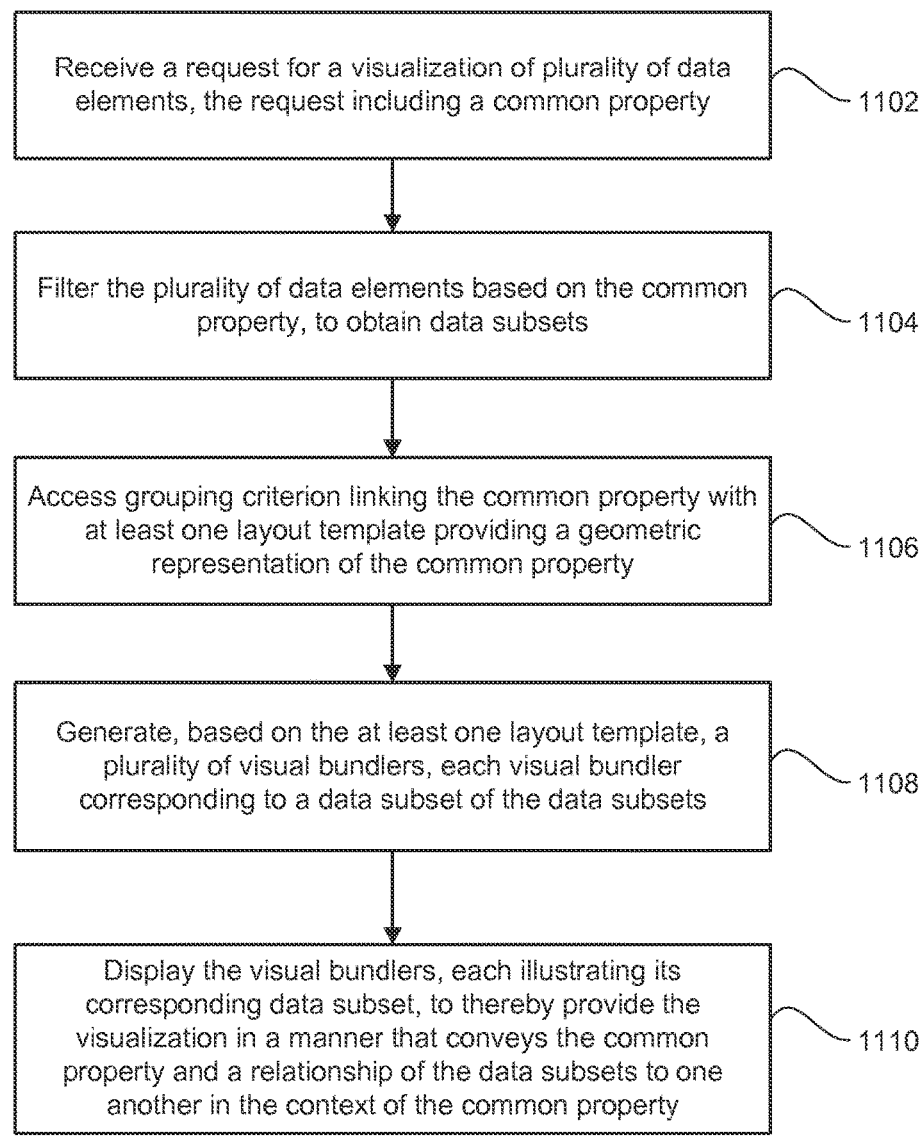
FIG. 11 is a flowchart illustrating example operations of the visualization engine in FIG. 10.

FIG. 11 is a flowchart 1100 illustrating example operations 1102-1110 of the visualization engine 102B of FIG. 10. As with FIG. 3, above, it will be appreciated that, although the operations 1102-1110 are illustrated as separate, sequential operations, any two or more of the operations may be executed in a partially or completely overlapping and parallel manner, or in a nested, iterative, looped, or branched manner. Moreover, in various implementations, additional or alternative operations or sub-operations may be included, and/or one or more operations may be omitted.

Figure 12A:
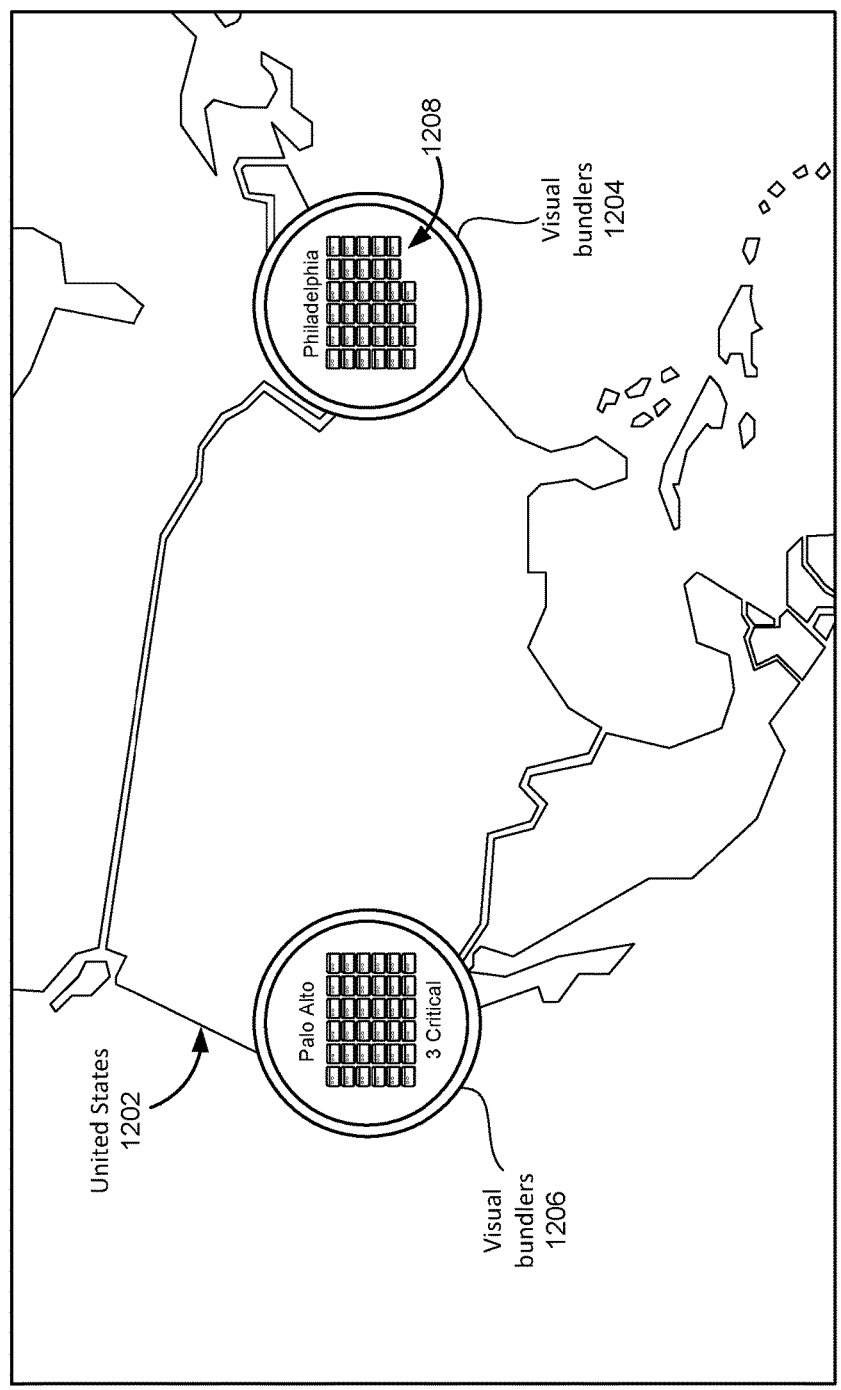
Figure 12B:
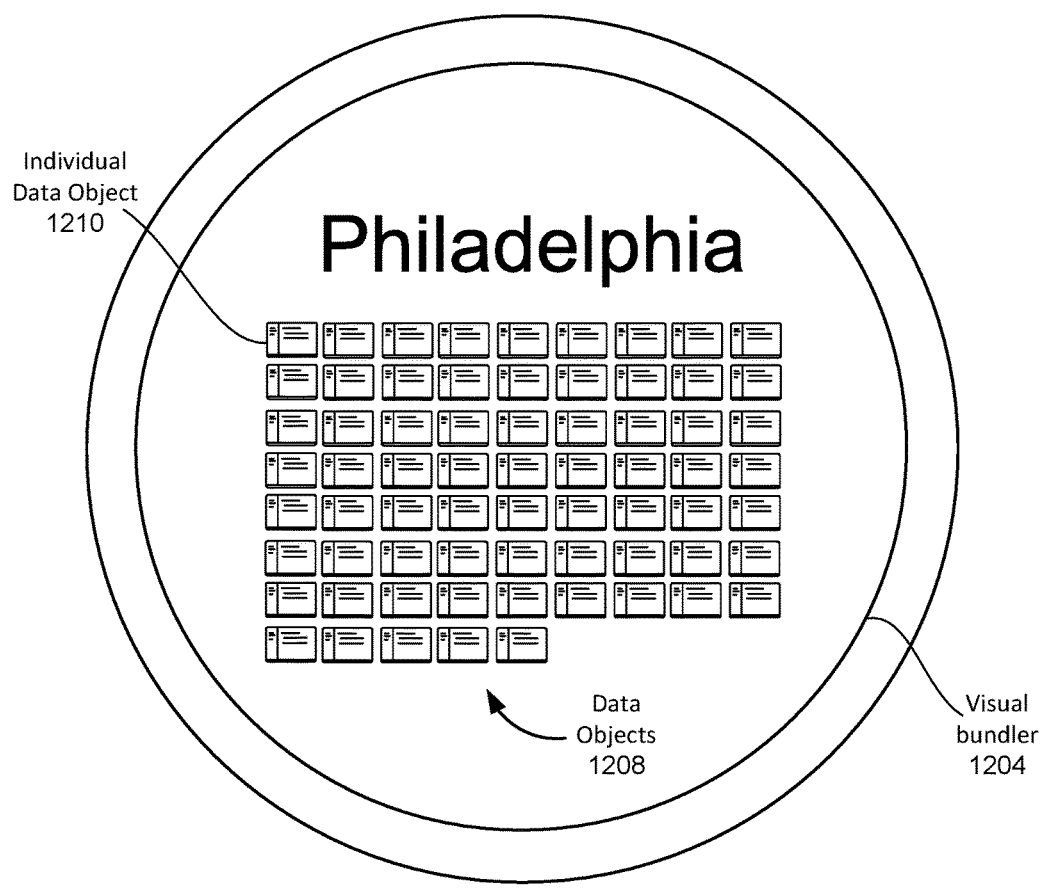
Figure 12C:
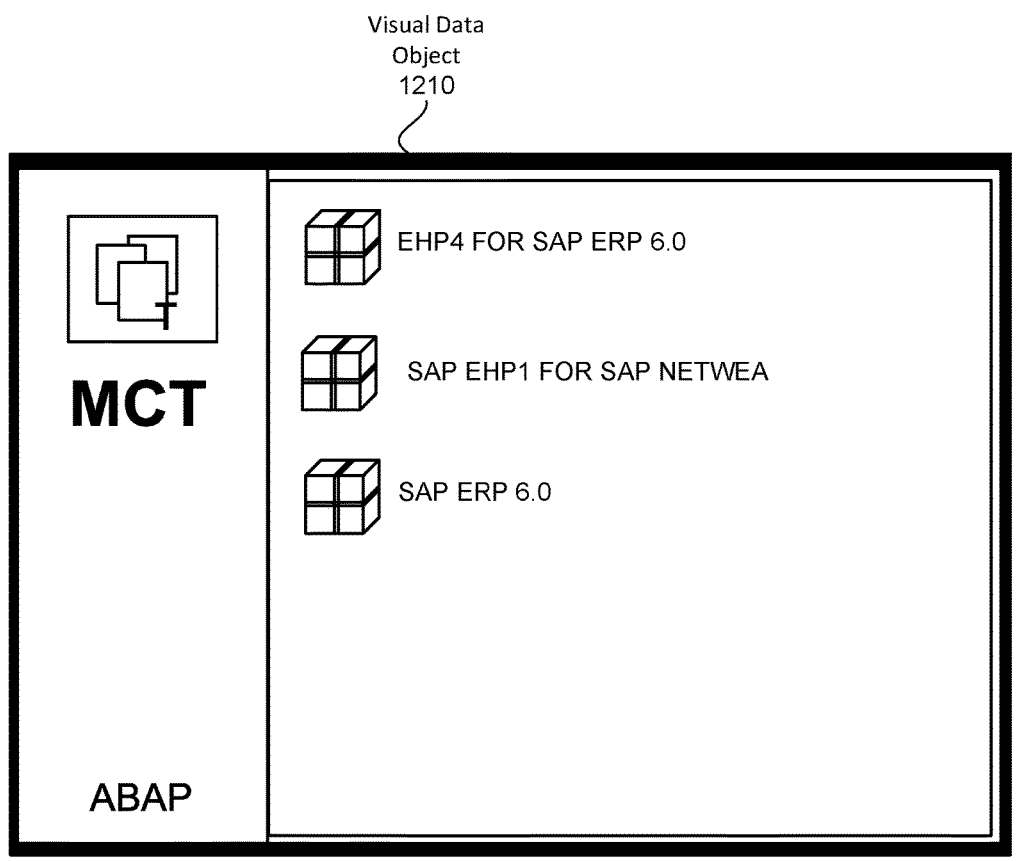

The following description of the example of FIG. 11 is provided with respect to FIGS. 12A, 12B, 12C, for the sake of illustration. It will be appreciated that such examples are illustrative and non-limiting, and various other examples are provided below with respect to FIGS. 13-19, while FIG. 20 provides an example of a more detailed operational flow of the visualization engine 102B.

In the example of FIG. 11, a request for a visualization of a plurality of data elements may be received, the request including a common property (1102). For example, the request handler 1002 of FIG. 10 may receive a request from a user for the visualization of data elements representing specified computing elements and resources within a system landscape of an enterprise or other entity. For example, as shown in FIG. 12A, a common property may represent a city or other location information associated with computing resources located therein, so that the city represents the common property referenced above. In FIG. 12A, a visual representation of the United States 1202 is illustrated with reference to the cities Philadelphia and Palo Alto, where it is assumed that the user has requested visualizations of computing resources within a system landscape of a national enterprise, including resources in the identified cities.

The plurality of data elements may be filtered based on the common property, to obtain data subsets (1104). For example, the property filter 1004 of FIG. 10 may be configured to filter data elements based on included values within a column or other field that is designated as providing a name of a city associated with a particular computing resource. For example, with reference to FIG. 1, it may occur that the database 104 has a complete listing of all computing resources of the national enterprise in question, where each computing resource is stored within the database 104 in a format that includes a city of location of each corresponding computing resource. Then, an appropriate query may be executed against the database 104, in order to obtain all relevant computing resources whereupon the property filter 1004 may filter the query results so as to identify individual data elements with a corresponding city of location.

A grouping criterion linking the common property with at least one layout template providing a geometric representation of the common property may be accessed (1106). For example, the template selector 1006 may access the grouping criterion 1008 to determine an appropriate geometric representation. In the example of FIG. 12A, a geometric representation includes the outline of the United States 1202, along with geometric shapes (e.g., circles) 1204 (representing the city of Philadelphia) and the circle 1206 (representing the city Palo Alto).

Based on the at least one layout template, a plurality of visual bundlers may be generated, each visual bundler corresponding to a data subset of the data subsets (1108). For example, the layout engine 1010 may be configured to generate the actual visualization of FIG. 12A, according to the selected templates and data subsets. In other words, it may be appreciated that the layout templates of the template repository 106 represent, by themselves, otherwise generic geometric representation and associated visualization options or other details.

For example, the template repository 106 may include templates for countries, such as the United States, as well as templates specifying circular shapes having specific optional/selectable characteristics, such as size, color, or associated text. Thus, in operation, the layout engine 1010 may be configured to combine these generic layout templates with actual data requested and provided by way of the request handler 1002 and the property filter 1004, to thereby instantiate an actual, desired visualization, such as the visualization of FIG. 12A.

That is, for example, the example of FIG. 12A illustrates the visualization of the United States 1202, along with specific visual bundlers 1204 and 1206 representing, respectively, Philadelphia and Palo Alto. Moreover, as shown, each of the visual bundlers 1204, 1206 include corresponding data elements of the defined data subsets, such as the visual data objects 1208 of the visual bundler 1204. The underlying, selected layout templates may provide options, such as optional sizes, colors, shapes, and included text, all of which represent potential options for the visualization of FIG. 12A. In a specific instance, however, the resulting visualization may be executed in a desired or specified manner. For example, the included visual bundlers would of course correspond to actual cities of location of interest of the national enterprise in question, and visual bundlers having different characteristics may be predefined or specified in a desired manner, e.g., different colors or shapes may be utilized to visualize the data object 1208 included within the visual bundler 1204. Moreover, specific, detailed information that is specific to an actual visualization being created may be included, such as a designation within the visual bundler 1206 that three of the computing resources included therein are considered to be in a critical condition.

Finally with respect to the example of FIG. 11, the visual bundlers, each illustrating its corresponding data subset, may be displayed, to thereby provide the visualization in the manner that conveys the common property and a relationship of the data subsets to one another in the context of the common property (1110). For example, the layout engine 1010 may be configured to display the visual bundlers 1204, 1206, each illustrating its corresponding data subset of computing resources located at the corresponding city, and within the visualization of the United States 1202. This way, as just referenced with respect to the operation 1110 of FIG. 11, the visualization of FIG. 12A may be provided in a manner that conveys that, for example, the common property of the data objects 1208 is geographical presence at a Philadelphia location, while a relationship of the data object representing Philadelphia and associated to the visual bundler 1206 provides further information for rendering the bundler (i.e., a relationship of the city in question within the United States).

In more detail with respect to the examples of FIG. 12A, 12B, 12C, as described above, the visualization of the FIG. 12A provides a birds-eye view of technical centers in city-specific data centers. Once provided with this visualization, the user may immediately be made aware of, for example, locations of relevant data centers, as well as which technical systems are included therein, and associated information such as a critical condition or other status of individual technical systems.

In the example of FIG. 12B, the visual bundler 1204 is illustrated as being magnified, so that an individual data object 1210 of the data objects 1208 may become more visible. Thus, as illustrated in the example of FIG. 12C, the visual data object 1210 may be magnified to a point that specific information regarding technical resources become visible. Of course, it will be appreciated that the magnification may be executed utilizing the techniques described above with respect to FIGS. 1-9. However, other techniques may also be used. For example, upon selection of the visual bundler 1204 by the user, the layout engine 1010 may be configured to dissolve or otherwise remove other elements or aspects of the visualization of FIG. 12A, while thereafter rendering the visual bundler 1204 at a requested size. Similar, this would apply to options for zooming into the data object 1210, as opposed to, e.g., dissolving the visual bundler 1204 and remaining ones of the data object 1208, in order to provide the visualization of the data object 1210 of FIG. 12C.

Figure 13:
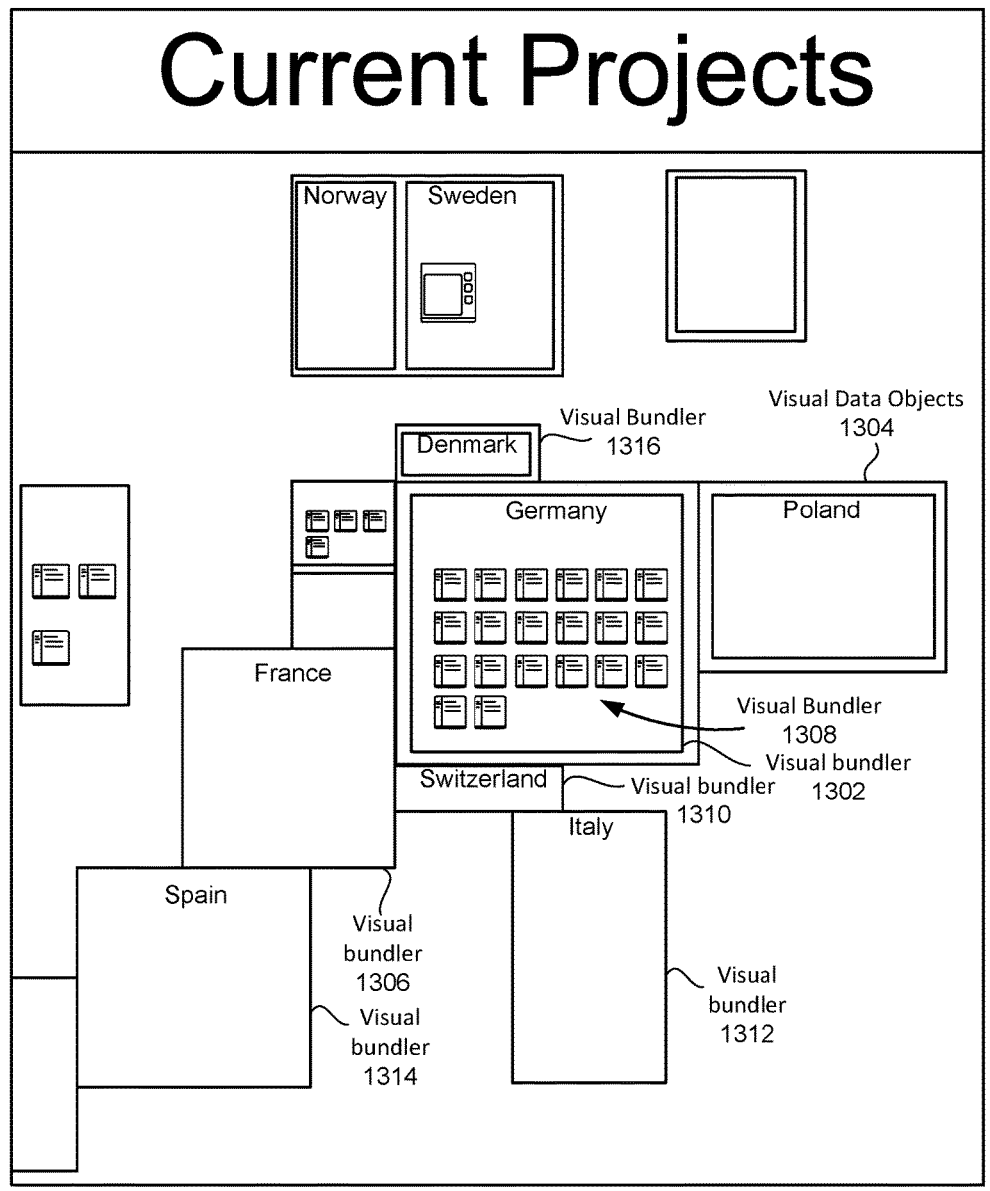
FIG. 13 is a block diagram of a second example visualization provided by the visualization engine of FIG. 10, in which visual bundlers correspond to geographic regions and current projects within each of the geographic regions.

FIG. 13 provides another example visualization that may be generated by the visualization engine 102B of FIG. 10. As shown, the example of FIG. 13 illustrates a visualization in which visual bundlers correspond to individual countries. For example, a visual bundler 1302 represents Germany, while included visual data objects 1304 represent current projects being undertaken by a business with customers or potential customers in Germany. Meanwhile, as shown, a visual bundler 1306 represents France, and included current projects being conducted there, although, as shown, individual data objects are not illustrated within the visual bundler 1306, for example, because no such current projects may exist, or, because a very large number of current projects exist and are therefore too numerous to be included individually within the visual bundler 1306.

Again with reference to the techniques of FIGS. 1-9, it may be appreciated that subsequent zooming on the visual bundler 1306 may result in a magnification of desired subsets of current projects in France to a visual/legible size. In additional or alternative implementations, the visual bundler 1306 may itself be resized larger, in order to individually display current projects that would be included therein. Similar comments apply to other visual objects within FIG. 13 (e.g., a visual bundler 1308 representing current projects in Poland, a visual bundler 1310 represent current projects in Switzerland, visual bundler 1312, representing projects in Italy, visual bundler 1314, representing current projects in Spain, and visual bundler 1316, representing current projects in Denmark).

In the example of FIG. 13, as may be appreciated from the above example of FIG. 12A, these various visual bundlers may optionally be created and visualized as a shape outline of a corresponding country. Further in the example of FIG. 13, the current projects represented by the data objects 1304 of the visual bundler 1302 are illustrated as individual visual blocks, each representing a current project. In example implementations, upon selection of the visual bundler 1302, the user may be provided with an option and ability to display the current projects represented by the data objects 1304 in a different desired manner.

Figure 14:
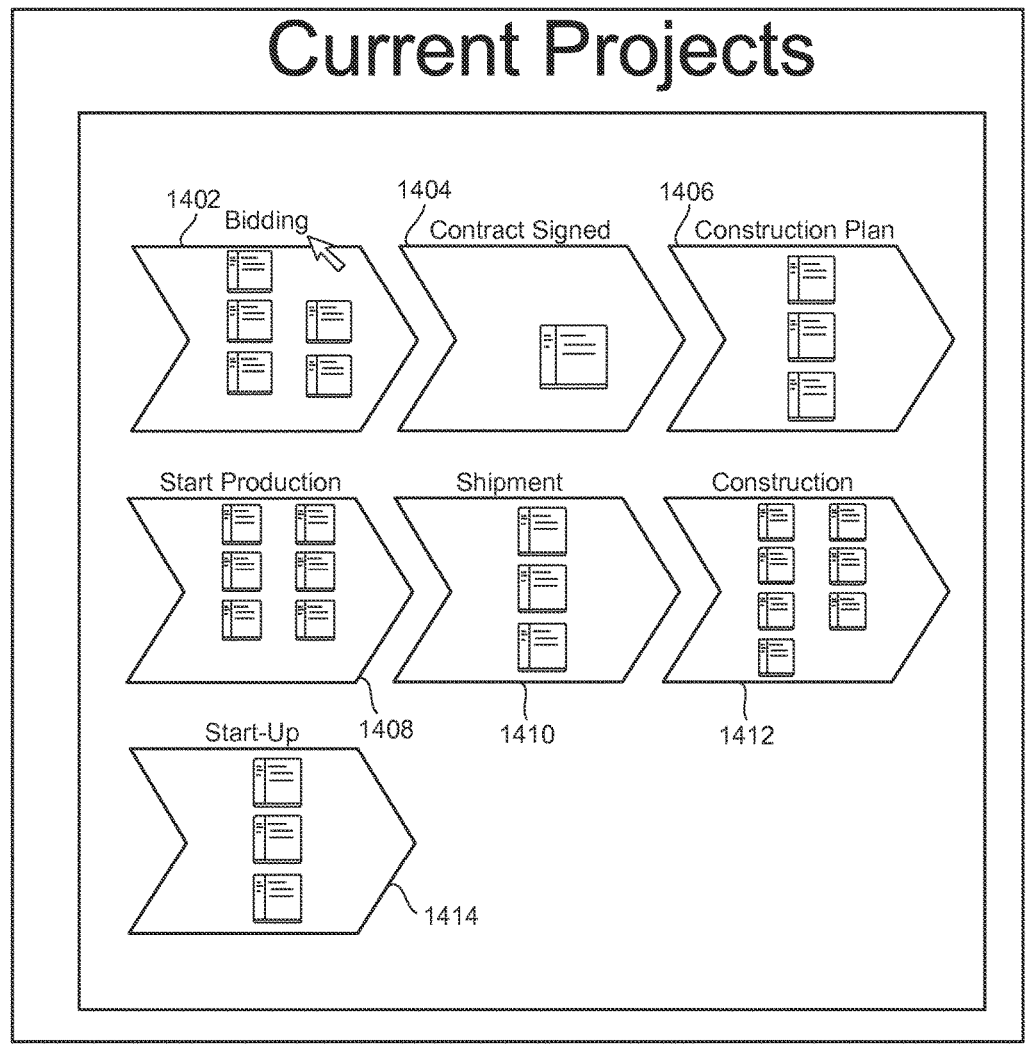
FIG. 14 is a block diagram illustrating current project stages of a selected geographic grouping of current projects from FIG. 13.

For example, in the example of FIG. 14, current projects are illustrated by stages 1402-1414. Specifically, as shown, a visual bundler 1402 corresponds to a bidding stage, a visual bundler 1404 corresponds to a contract sign stage, a visual bundler 1406 corresponds to a construction plan stage, while a visual bundler 1408 corresponds to a start production stage. Further, a visual bundler 1410 corresponds to a shipment stage, a visual bundler 1412 corresponds to a construction stage, and a visual bundler 1414 corresponds to a startup stage.

Thus, as may be appreciated, the user may quickly and easily determine which projects are in which project stage. For example, the user may notice that a relatively large number of current projects are in the visual bundler 1412 representing construction stage, and may investigate the construction stage in order to verify that no difficulties are present which might contribute to the construction stage representing a bottleneck in the overall advancement of current projects through the various stages of FIG. 14.

Figure 15:
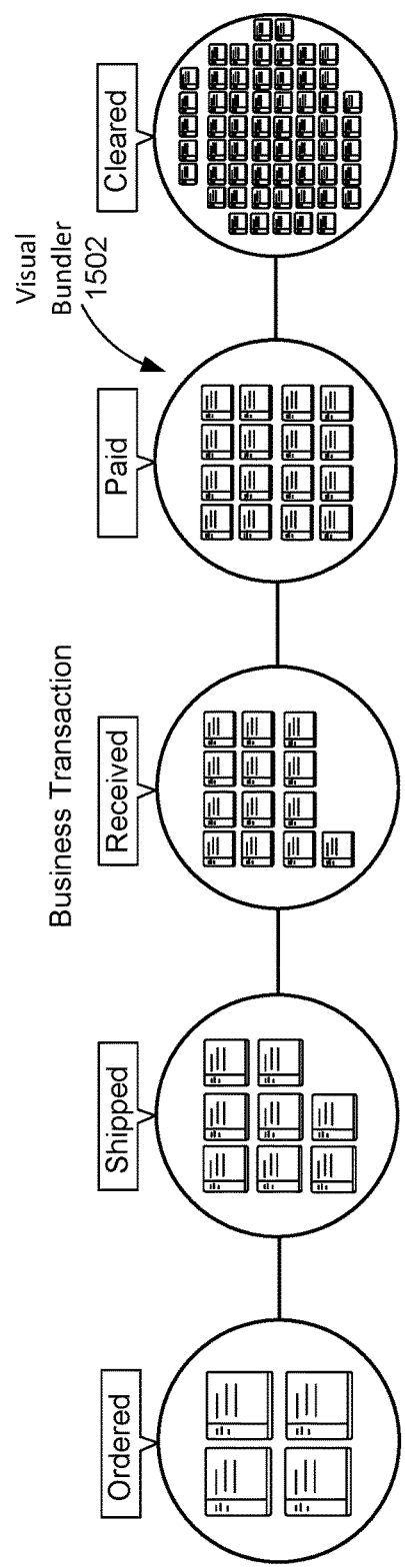
FIG. 15 is an alternate view of the transaction stage diagram of FIG. 4B, using an alternate embodiment provided by the visualization engine of FIG. 10.

FIG. 15 provides an example visualization corresponding generally to the example visualization of FIG. 4B, and therefore not described here in detail. Instead, FIG. 15 is intended to illustrate a visual bundler 1502, which may represent, or correspond to, the visual data object 426 of FIG. 4B. That is to say, the visual data object 426 of FIG. 4B may be understood to be constructed using the visual bundler techniques described above with respect to FIGS. 10 and 11. Conversely, the visual bundler 1502 of FIG. 15 may or may not utilize the magnification and zooming techniques described above with respect to FIGS. 4B, 5, 6 and 7.

Figure 16:
FIG. 16 is an alternate view of the diagram of paid transactions of FIG. 5, provided by the visualization engine of FIG. 10.

For example, as shown in FIG. 16, visual data objects 1602 generally correspond to the visual data objects 502 of FIG. 5. However, the data object 1602 need not necessarily be obtained for viewing through the magnification and zooming techniques described above with respect to FIGS. 4B and 5. Instead, for example, as referenced above, the visualization of FIG. 15 may be dissolved, so that all other visual data objects of FIG. 15 disappear, while the visual data objects 1602 within the paid stage are automatically distributed evenly over an available viewing area.

Figure 17:
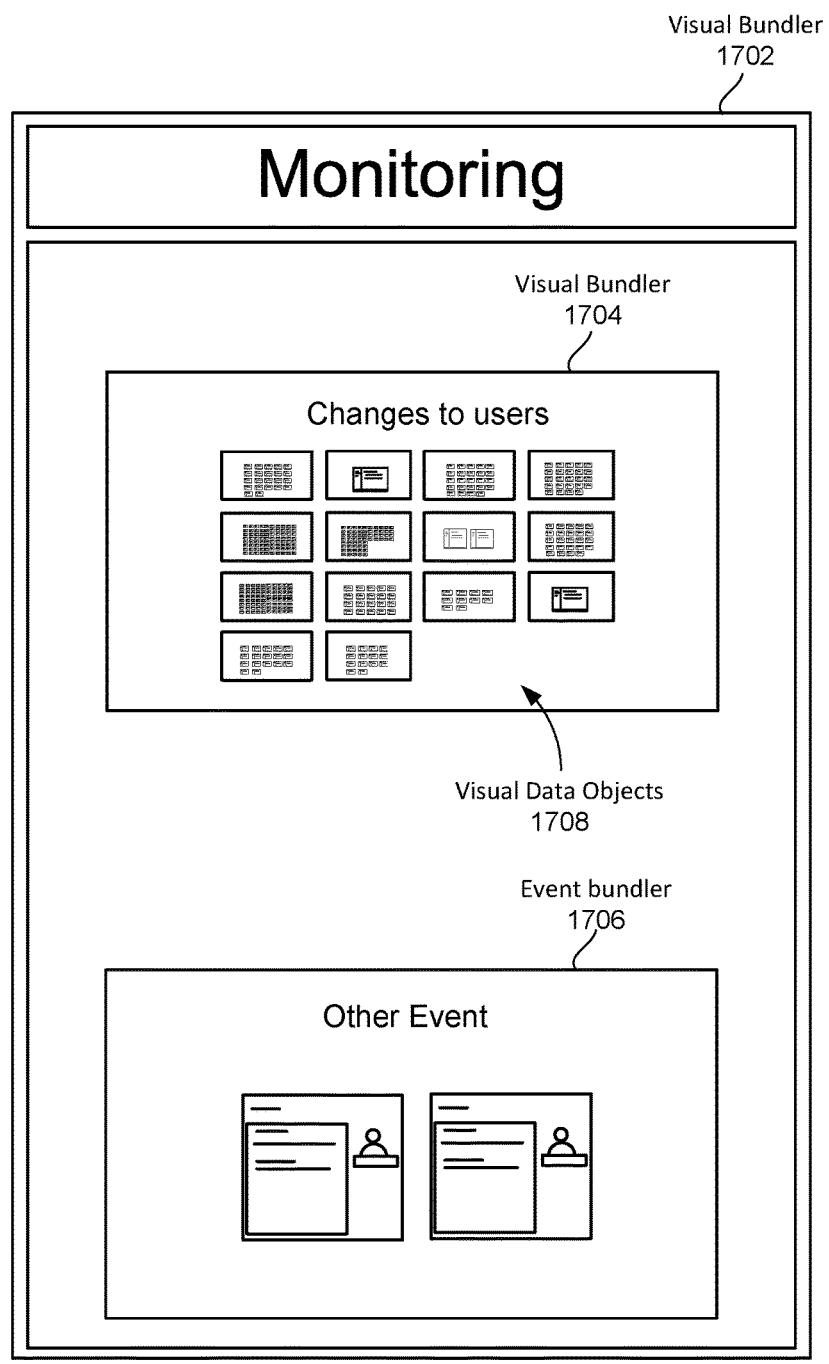
FIG. 17 is a first screenshot illustrating an example embodiment using nested visual bundlers provided by the visualization engine of FIG. 10.
Figure 18:
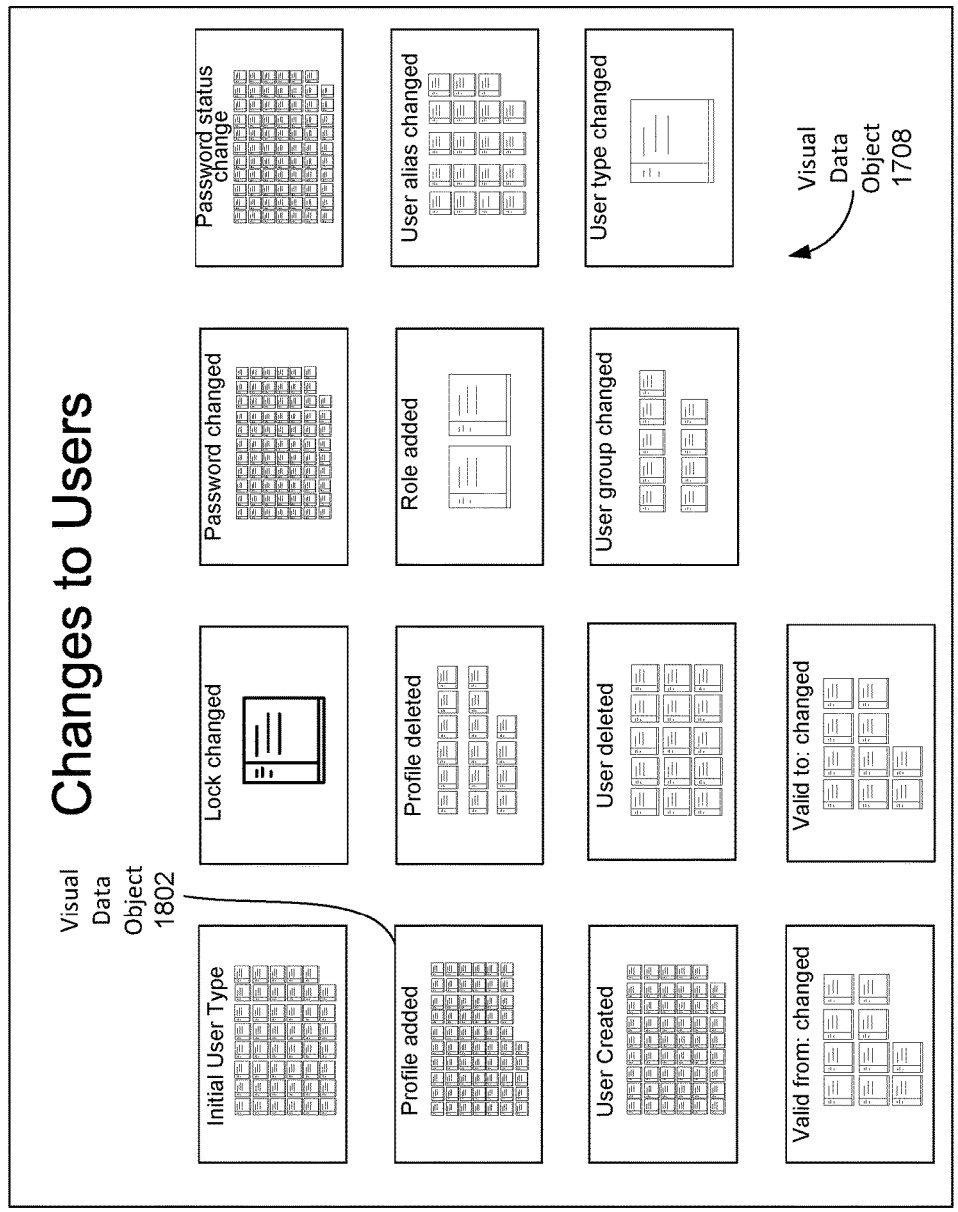
FIG. 18 is a magnified view of a screenshot of FIG. 17.
Figure 19:
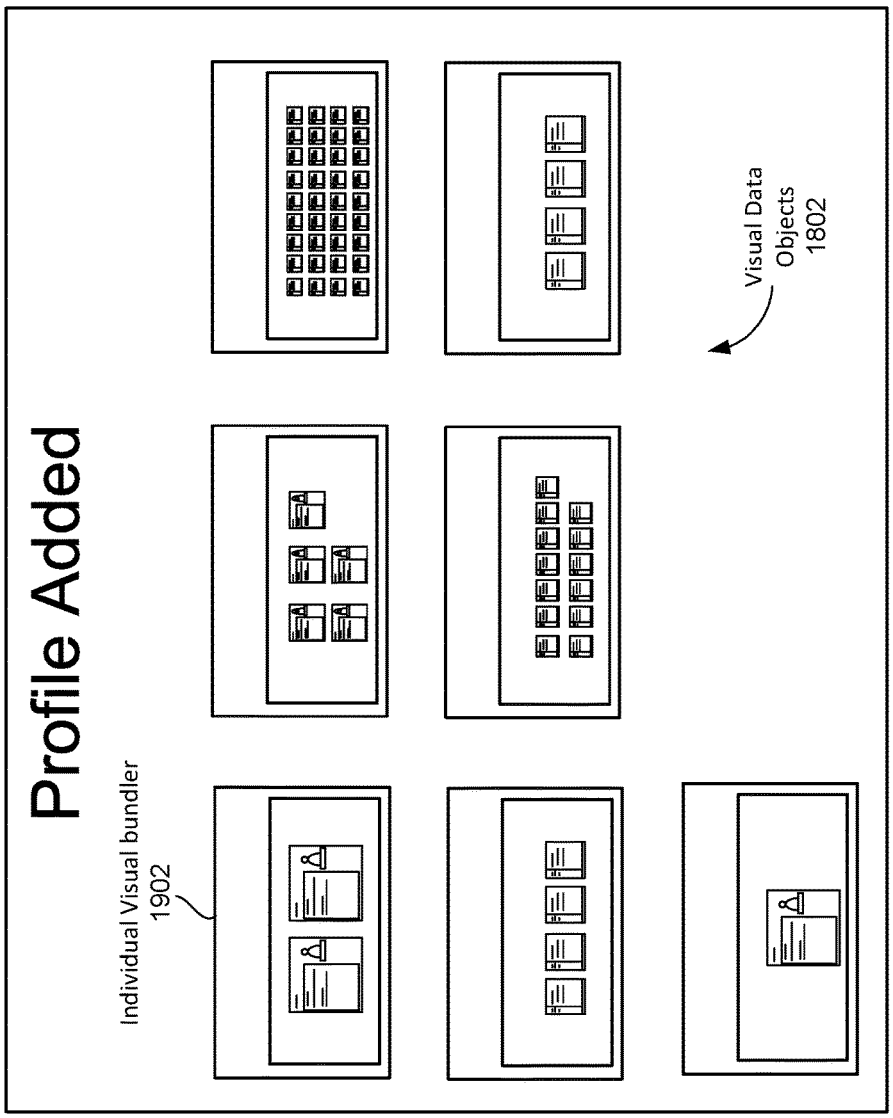
FIG. 19 is a magnified view of a selected element of the screenshot of FIG. 18.
Figure 20:
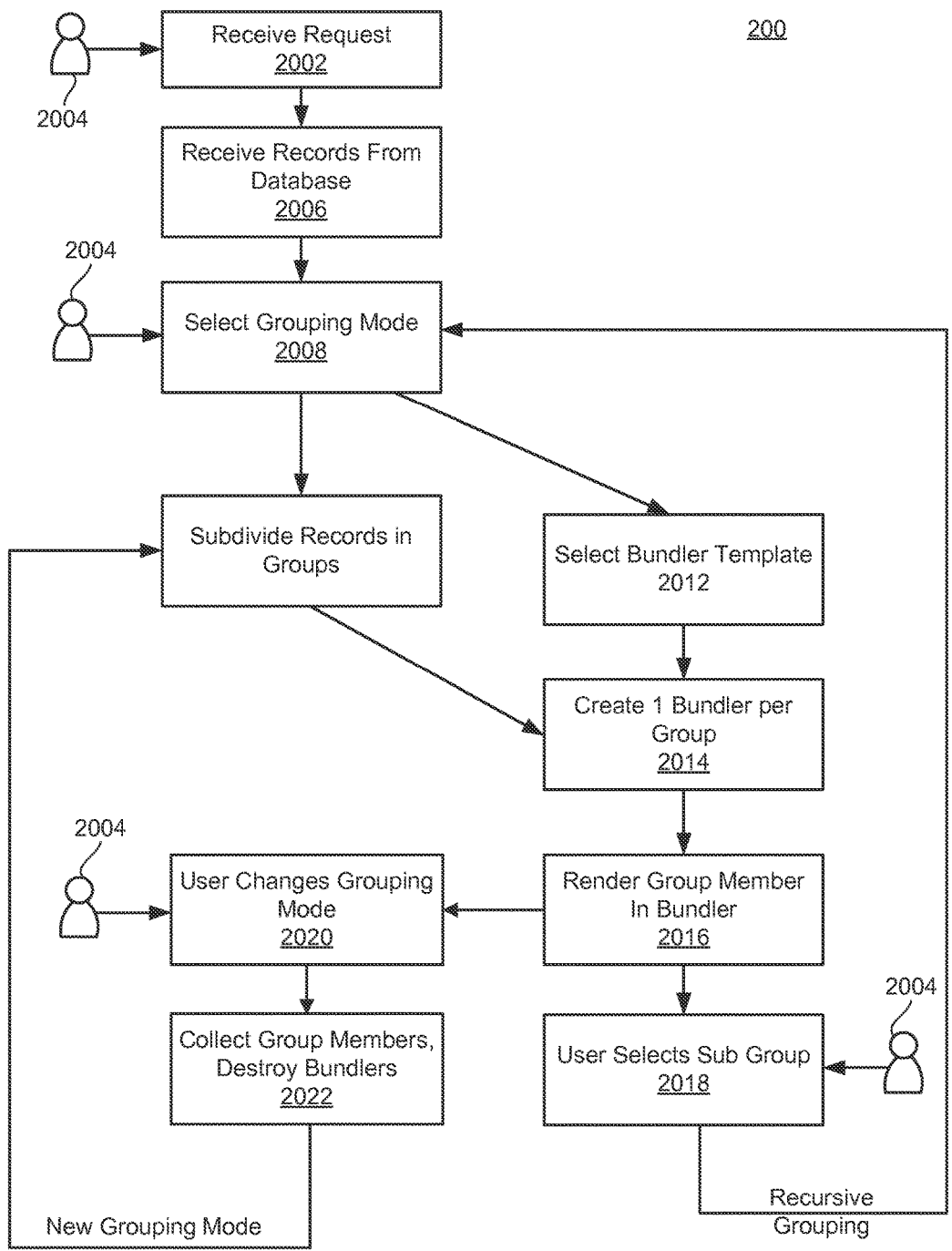
FIG. 20 is a flowchart illustrating more detailed example operations of the visualization engine of FIG. 10.

FIG. 17-19 illustrate an example of nested visual bundlers. In the example of FIG. 17, a visual bundler 1702 illustrates a monitoring bundler associated with monitoring operations of an example computer system. On the highest level within the visual bundler 1702, the included system events are grouped by event type, wherein a visual bundler 1704 corresponds to events associated with changes to users, while a visual bundler 1706 include all other events.

Thus, for example, zooming in on the other event bundler 1706 might show, for example, bundlers for different interaction types, such as "download" or "field content change." Meanwhile, within the visual bundler 1704, various visual data objects 1708 represent system events associated with changes made to individual user accounts. FIG. 18 illustrates a magnified view of the visual data objects 1708 associated with changes to users. As shown, many different such user changes may be included, e.g., a creation or deletion of a user, profile, or role, or a change or status of a password, alias, or group. Specifically, the visual bundler 1802 corresponds to user profiles that have been added.

Consequently, when these visual data objects 1802 associated with an added profile are provided in the example visualization of FIG. 19, an individual visual bundler 1902 may be provided which is at a level of a specific user associated with the added profile. Thus, as may be appreciated, the examples of FIGS. 17-19 illustrate that the described nesting of visual bundlers essentially realizes a geometric equivalent of a dynamically-generated search tree. That is, as shown and described, a structure for executing a search for a desired data element (e.g., a search for the specific user profile added and associated with the visual bundler 1902) is not required to be fixed or otherwise predefined. Consequently, during a runtime of providing visualizations of FIGS. 17-19, multiple alternative search trees may be created for the same underlying content, with minimal effort, and in a manner which is highly intuitive and useful for the user. For example, the geometric nature of the illustrated nested bundlers implies that the user may receive a distribution of content over bundlers, without having to manually open/close any folder or node.

In a similar example, not specifically illustrated, a visual bundler for logging on to a system may include embedded bundlers corresponding to different terminal identifiers. Then, for a particular terminal identifier, a third level of bundlers may be included, which represent different timestamps. Thus, at the final embedded level, the user may be provided with subsets of logon events that occurred at a specific time, and from a specific terminal.

In a different context, e.g., a medical context, cases for thousands of patients may be grouped by diagnoses. Then, even for a large number of different subgroups corresponding to different diagnosis, the user may immediately visualize which subgroups/diagnoses contain a large number of patients, and which contain relatively few patients. Moreover, each patient may be associated with a visual coding to correspond to an aspect of the diagnosis, such as, e.g., a level of prognosis corresponding to a range of possible medical outcomes.

FIG. 20 is a flowchart 2000 illustrating more detailed operations of the visualization engine 102B of FIG. 10. In the example of FIG. 20, a request may be received (2002) from a user (2004). In the example, the request may immediately be applied against the database 104, so that records representing query results may be received therefrom (2006).

The user 2004 may then select a desired grouping mode (2008). Various example of such grouping modes are provided, or would otherwise be apparent. Once the grouping mode has been selected, the retrieved data records may be subdivided in groups accordingly (2010). At the same time, a corresponding, appropriate bundler layout template may be selected (2012). Consequently, as described, a bundler for each group may be created (2014), using the selected template. Rendering of the thus-grouped members within a corresponding bundler may then be executed (2016).

If the user 2004 selects a particular subgroup from a particular bundler (2018), then recursive grouping may be implemented. That is, as shown, the user 2004 may select a new or different grouping mode (2008), thus ultimately resulting in a corresponding rendering of included group members within the newly-created visual bundler.

In this way, for example, the user 2004 may create visual bundlers including data subsets grouped according to a common property. Then, the user 2004 may create embedded visual bundlers within the visual bundlers, in which each data subset is grouped according to a second common property. Afterwards, the user 2004 may instead re-group the data subset of each visual bundler according to a third common property, in place of the second common property. Or, the user 2004 may create further-embedded visual bundlers within the embedded visual bundlers.

To provide further additional examples related to such recursive grouping, for example, it may occur that, in the example of FIG. 12A, the user initially elects to group technical systems based on city of location of an underlying data center. Thereafter, however, the user 2004 may select one such resulting visual bundler (e.g., the visual bundler 1204 of FIG. 12A, and may thereafter group the included data objects 1208 according to some other grouping criteria (common property). For example, the data objects 1208 may be grouped according to a current status of each of the underlying technical systems. In this way, for example, the user 2004 may easily perform an iterative, recursive, dynamic search, in a visual and intuitive manner. For example, the user 2004 may, in the manner just described, easily locate a particular technical system within a Philadelphia data center that has contributed to an exception in operations of the IT landscape.

Optionally, as shown, following a rendering of group members within a bundler (2016), the user 2004 may be provided with an option to change a current grouping mode (2020). In this case, the group members of the various current bundlers may be collected, while the current bundlers are destroyed (2022). Thereafter, the new grouping mode is implemented, including subdividing the existing records in new groups, according to the new grouping mode. In other words, the user 2004 may regroup the data elements according to a second common property to get a second plurality of visual bundlers, using second geometric shapes to convey the common property and the relationships between the data elements and between the visual bundlers.

For example, in the example of FIG. 12A, the user may wish to completely remove the visualization based on city of location within the United States, and may instead, for example, group all technical systems according to some other grouping criterion. For example, the user 2004 may specify grouping of all technical systems according to a current status, regardless of location, or according to some other criterion, such as current operating system, or most recent crash or other malfunction.

In order to implement the various features and functions described, the layout templates of the template repository 106 may be soft-coded. For example, the following pseudo code represents an example soft-coding for a visual bundler.

Pseudo Code 1

```
{   "ID": "processbundler",
    "style": "default",
    "aspect-ratio": 1.6,
    "elements": [
        {   "element": "shape",
            "id": "background",
            "contour": "arrow",
            "color": "FFAFCF70",
            "plasticity": 12
        },
        {   "element": "label",
            "id": "caption",
            "y": "1%w",
            "x": "5%w",
            "width": "82%w",
            "height": "12%w",
            "format": {
                "text-align": "center",
                "font": "Verdana",
                "font-weight": "bold",
                "letter-spacing": 1,
                "color": "FF505050"
            },
            "line-aspectratio": 8,
            "content": "$core:name"
        },
        {   "element": "set",
            "id": "children",
            "contour": "rectangle",
            "x": "18%w",
            "y": "22%h",
            "width": "66%w",
            "height": "70%h",
            "content": "$children"
        }
    ]
}
```

As shown in pseudo code 1, elements of the visual bundler may be defined, such as a shape, background, contour, color, and plasticity. Further, a static label or caption may be included, along with specifications for a size and positioning thereof. Associated formatting and content may be specified. Further, children of the visual bundler may similarly be specified. As shown, children elements also may be specified according to contour and content.

As described above, the aggregator 1012 of FIG. 10 may be configured to provide aggregations for specified bundlers. For example, a bundler grouping a specific type of financial transaction may be operated on by the aggregator 1012 to obtain a total monetary value of the bundled financial transactions.

More generally, every time a bundler is grouped, the aggregator 1012 may create an aggregation object for each bundler or bundler subgroup. The required aggregations may be determined from the grouping information in the selected bundler layout template, and may be evaluated and dynamically assigned to the corresponding aggregation object. Then, the algorithms arranging the visual bundlers, i.e., as described above with respect to the layout engine 1010, may access the aggregation objects for use in conjunction with layout algorithms translating the selected bundler layout template into the requested instantiated visualization. As a result, aggregated values may easily and prominently be displayed in conjunction with each visual bundler. As referenced above, aggregation bodies may include, e.g., NIN(minimum), MAX(maximum), AVG(average), COUNT, and SUM. These and other aggregation values may be applied to any appropriate attribute of the objects contained in the subset of a visual bundler in question.

By way of more specific example of the type of algorithm referenced above for creating the subgroups of a set of visual bundlers, the following algorithm may be used. For example, for all items in a set to be subdivided, the grouping property may be evaluated. Then, for each occurring property value, an unambiguous, alphanumeric key may be calculated (e.g., using an appropriate hash function).

The resulting key may be used as a signature of the corresponding subgroup. Then, all such subgroups may be stored in a dictionary data structure configured to associate the signature with the corresponding subgroup. Consequently, if the dictionary data structure contains the property signature of an object as a key, this object will be assigned to the corresponding group. If the key is not contained in the dictionary, however, a new subgroup for the respective signature may be generated and stored in the dictionary.

As a result, in this example, when a bundler is created for each subgroup (i.e., for each distinct attribute value), the data objects assigned to this subgroup will be removed from the original set and arranged within the contour of the visual bundler. If an item occurs in several subgroups, the item may be replicated so there is one copy in each of the corresponding visual bundlers.

Thus, the systems and methods described above provide for a very fast and flexible exploration of very large datasets. The user feels in control due to the perception that all desired content is visible, and that it is possible to drill down, inspect, group, select, and arrange content arbitrarily in the course of exploring and investigating specific questions.

Moreover, no context changes between aggregated views and analysis on individual object levels may be perceived. Further, the visually expressive groupings provided by the visual bundler described herein ensure that a user is not overwhelmed by flat sets of hundreds of thousands of objects, but rather sees the higher level structures in a birds-eye view, and in finer detail while zooming in. Moreover, as described, a multilevel zooming is possible. Consequently, if the user repeatedly groups a set of data objects, drills down into a subset thereof, and then groups the subset again, the context of the preceding steps is not lost, but rather is preserved in the visual structure of the higher zoom levels.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Non-transitory information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including instructions recorded on a non-transitory computer-readable storage medium, and executable by at least one processor, the system comprising:
   a request handler configured to cause the at least one processor to receive a request for a visualization of plurality of data elements, the request including a common property;
   a property filter configured to cause the at least one processor to filter the plurality of data elements based on the common property, to obtain data subsets;
   a template selector configured to cause the at least one processor to access at least one grouping criterion linking the common property with at least one layout template providing a geometric representation of the common property; and
   a layout engine configured to cause the at least one processor to generate, based on the at least one layout template, a plurality of visual bundlers, each visual bundler corresponding to a data subset of the data subsets, and further configured to display the visual bundlers, each illustrating its corresponding data subset, to thereby provide the visualization in a manner that conveys the common property and a relationship of the data subsets to one another with respect to the common property,
   wherein the layout engine is further configured to cause the at least one processor to recursively generate additional, nested visual bundlers within at least one of the plurality of visual bundlers, the nested visual bundlers being embedded within one another in a plurality of nesting levels, each nesting level associated with at least one corresponding level-specific common property and associated data subset.

2. The system of claim 1, wherein the request handler is configured to cause the at least one processor to execute the request against a database to retrieve the data elements.

3. The system of claim 1, being further configured to destroy the visual bundlers and re-group the data elements using a second plurality of visual bundlers, in which the layout engine is configured to cause the at least one processor to generate, based on at least a second layout template linked to the second common property by the at least one grouping criterion, the second plurality of visual bundlers, each illustrating a corresponding second data subset, to thereby provide a second visualization in a manner that conveys the second common property and a second relationship of the second data subsets to one another with respect to the second common property.

4. The system of claim 1, comprising a template repository storing the plurality of layout templates, including the at least one layout template, wherein the plurality of layout templates are stored in a hierarchical structure in which layout templates are embeddable within one another at each level of the hierarchical structure to thereby enable formation of the nesting levels of visual bundlers.

5. The system of claim 4, wherein, within each visual bundler, each data subset is further grouped according to a second common property to form a second nesting level of the plurality of nesting levels, and, for each visual bundler, the layout engine is configured to cause the at least one processor to generate, based on at least a second layout template, an embedded plurality of visual bundlers at the second nesting level, each of the embedded plurality of visual bundlers identifying a further data subset of the corresponding data subset, and further configured to display the embedded visual bundlers within each visual bundler.

6. The system of claim 5, wherein the embedded visual bundlers at the second nesting level are recursively regrouped within the visual bundlers, according to a third common property, to thereby form further embedded visual bundlers at a third nesting level of the plurality of nesting levels.

7. The system of claim 1, being further configured to magnify the embedded, nested visual bundlers, including retrieving data to be displayed therein from a database in response to the data reaching a data threshold, and prior to the data reaching a visual threshold at which rendering of the data is initiated.

8. The system of claim 1, further comprising an aggregator configured to cause the at least one processor to aggregate, for each visual bundler, data values of the included data subset for display thereof in conjunction with the corresponding visual bundler.

9. The system of claim 1, wherein the layout engine is configured to determine a position and size of each visual bundler, relative to remaining visual bundlers, based on data values of the data subsets of each visual bundler.

10. A computer-implemented method for executing instructions stored on a non-transitory computer readable storage medium, the method comprising:
   providing a dynamically-generated visualization of a search tree for searching a data set to identify at least one data record, the dynamically generated visualization including nested visual bundlers having a plurality of nesting levels, wherein each nesting level is associated with a corresponding common property defining data subsets within visual bundlers of that nesting level, and each successive nesting level is generated based on its corresponding common property as identified in conjunction with display of a preceding nesting level, the providing including
   receiving a first request for a first visualization of plurality of data elements, the first request including a first common property;
   filtering the plurality of data elements based on the first common property, to obtain first data subsets;
   accessing at least one grouping criterion linking the first common property with at least one layout template providing a geometric representation of the first common property;
   generating, based on the at least one layout template, a first plurality of visual bundlers, each visual bundler corresponding to a data subset of the first data subsets; and
   displaying the first plurality of visual bundlers, each illustrating its corresponding data subset, to thereby provide the first visualization in a manner that conveys the first common property and a relationship of the first data subsets to one another with respect to the first common property, wherein the receiving, filtering, accessing, generating, and displaying are recursively repeated at each of the nesting levels to identify the at least one data record within a bottom-most nesting level.

11. The method of claim 10, further comprising:

destroying the first visual bundlers and re-grouping the data elements using a second plurality of visual bundlers and second common property, including generating, based on at least a second layout template linked to the second common property by the at least one grouping criterion, the second plurality of visual bundlers, each illustrating a corresponding second data subset, to thereby provide a second visualization in a manner that conveys the second common property and a second relationship of the second data subsets to one another with respect to the second common property.

12. The method of claim 10, wherein the at least one layout template is stored within a plurality of layout templates within a template repository, and wherein the plurality of layout templates are stored in a hierarchical structure in which layout templates are embeddable within one another at each level of the hierarchical structure to thereby enable formation of the nesting levels of visual bundlers.

13. The method of claim 12, wherein, within each visual bundler of the first visual bundler, each data subset is further grouped according to a second common property defining a second nesting level of the plurality of nesting levels, and further including generating, based on at least a second layout template, an embedded second plurality of visual bundlers, each of the embedded second plurality of visual bundlers identifying a further data subset of the corresponding data subset, and displaying the embedded second plurality of visual bundlers within each visual bundler of the first plurality of visual bundlers.

14. The method of claim 13, further including recursively regrouping the embedded visual bundlers at the second nesting level within the first plurality of visual bundlers, according to a third common property, to thereby form further embedded visual bundlers at a third nesting level of the plurality of nesting levels.

15. A computer program product, the computer program product being tangibly embodied on a non-transitory computer-readable storage medium and comprising instructions that, when executed by at least one computing device to, are configured to cause the at least one computing device to:

receive a first request for a visualization of plurality of data elements, the first request including a first common property;

filter the plurality of data elements based on the first common property, to obtain first data subsets;

generate, based on at least one layout template, a first plurality of visual bundlers, each visual bundler corresponding to a data subset of the first data subsets;

display the first plurality of visual bundlers, each illustrating its corresponding data subset, to thereby provide the visualization in a manner that conveys the first common property and a relationship of the first data subsets to one another with respect to the first common property;

receive, for at least one of the first plurality of visual bundlers, a second request identifying a second common property;

filter the plurality of data elements included within at least one of the first plurality of visual bundlers, based on the second common property, to obtain second data subsets within the at least one of the first plurality of visual bundlers;

generate, based on the at least one layout template, a second plurality of visual bundlers embedded within the at least one of the first plurality of visual bundlers;

display the second plurality of visual bundlers, each illustrating its corresponding data subset, to thereby modify the visualization to include the second common property and a relationship of the second data subsets to one another with respect to the first common property and the second common property.

16. The computer program product of claim 15, wherein the instructions, when executed, are further configured to cause the at least one processor to:

access at least one grouping criterion linking the first common property and the second common property with at least one layout template providing a geometric representation of the first common property and the second common property, respectively.

17. The computer program product of claim 15, comprising a template repository storing a plurality of layout templates, including the at least one layout template, wherein the plurality of layout templates are stored in a hierarchical structure in which layout templates are embeddable within one another at each level of the hierarchical structure.

18. The computer program product of claim 17, wherein the embedded second plurality of visual bundlers are recursively regrouped, according to a third common property.

19. The computer program product of claim 15, wherein the instructions, when executed, are further configured to cause the at least one processor to:

magnify the embedded visual bundlers, including retrieving data to be displayed therein from a database in response to the data reaching a data threshold, and prior to the data reaching a visual threshold at which rendering of the data is initiated.

* * * * *